Sept. 22, 1931.  A. BROADMEYER  1,823,876
SHEET MOUNTING APPARATUS
Filed Nov. 23, 1928   13 Sheets-Sheet 1

Inventor
ALBERT BROADMEYER
By
Attorney

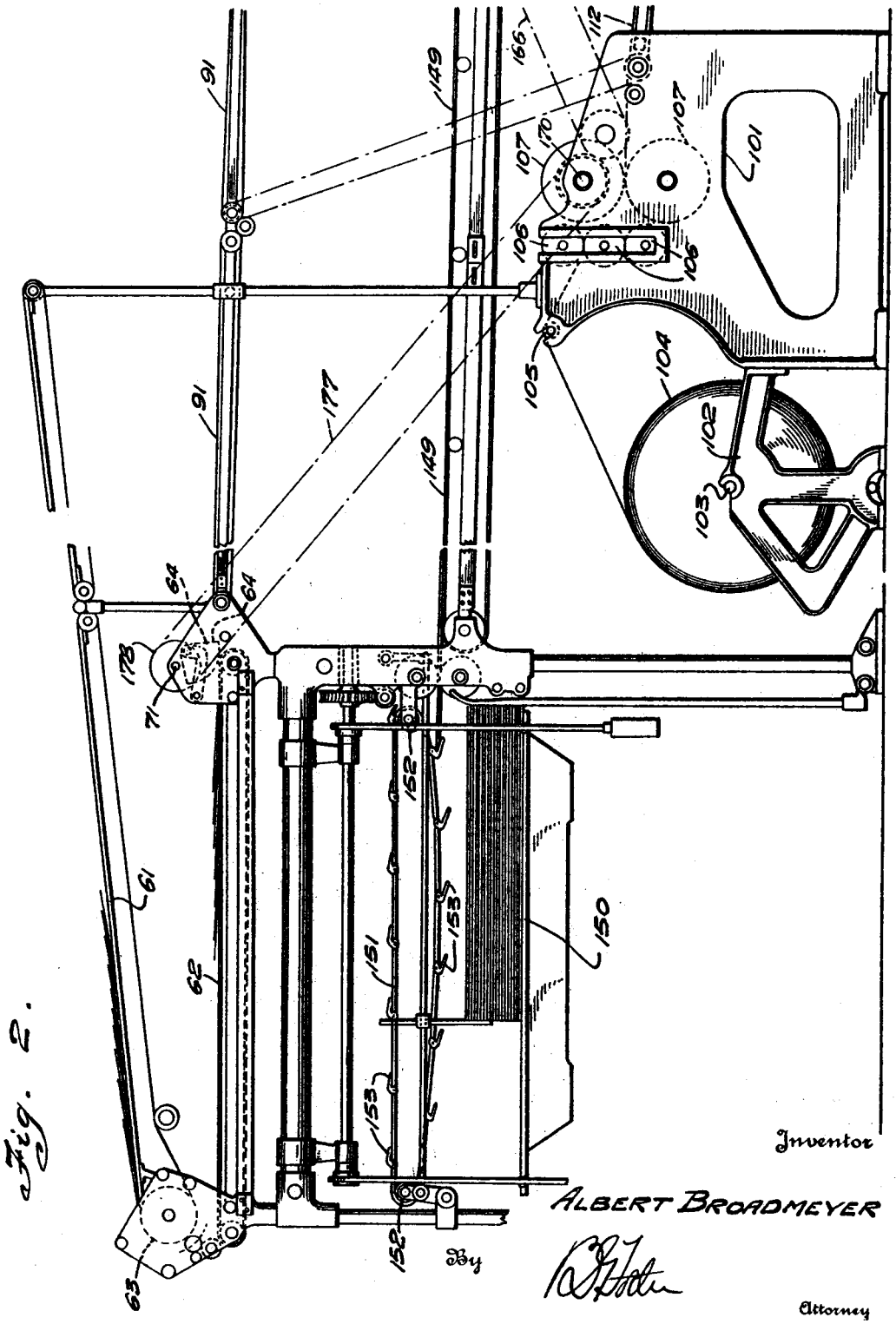

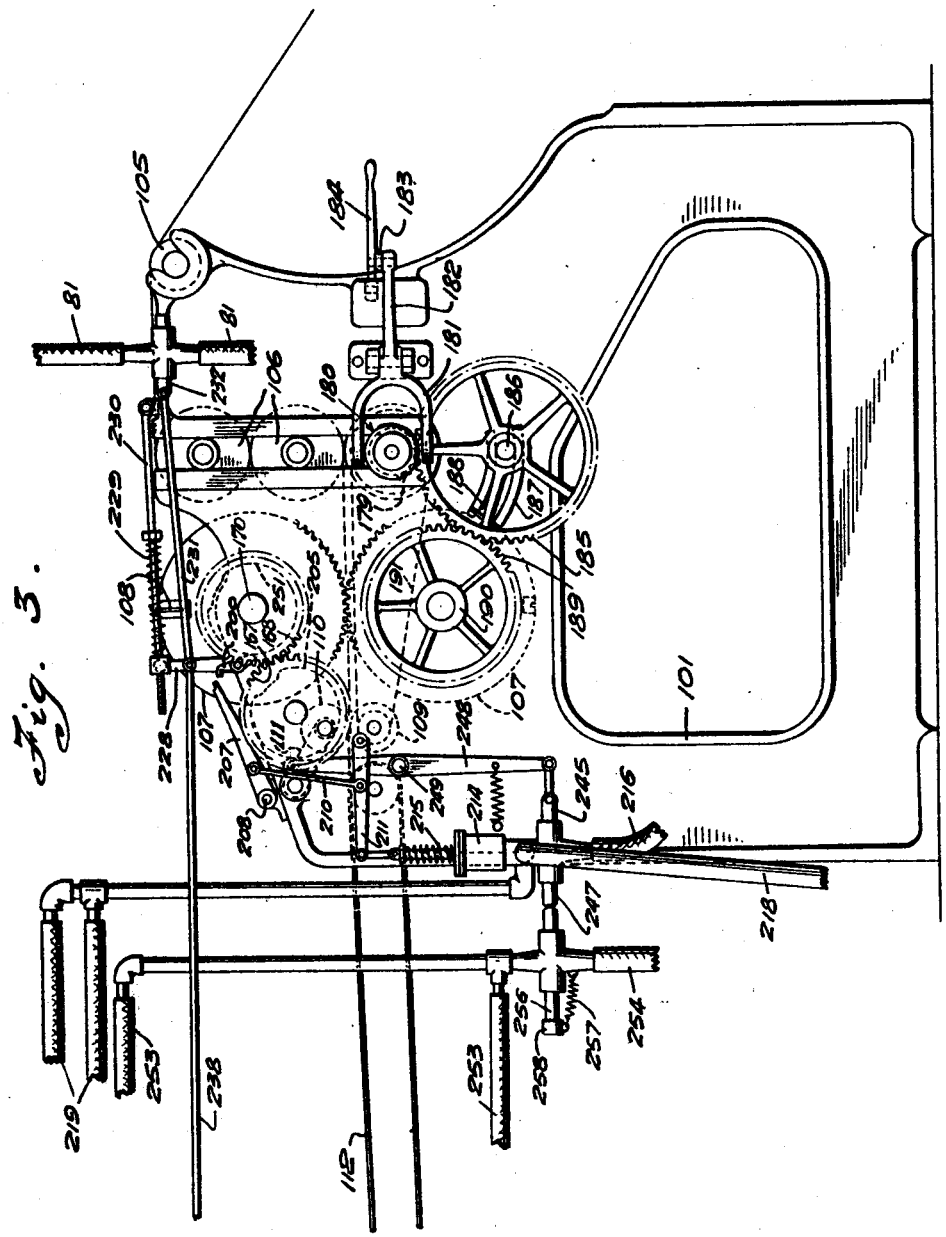

Sept. 22, 1931.  A. BROADMEYER  1,823,876
SHEET MOUNTING APPARATUS
Filed Nov. 23, 1928   13 Sheets-Sheet 4
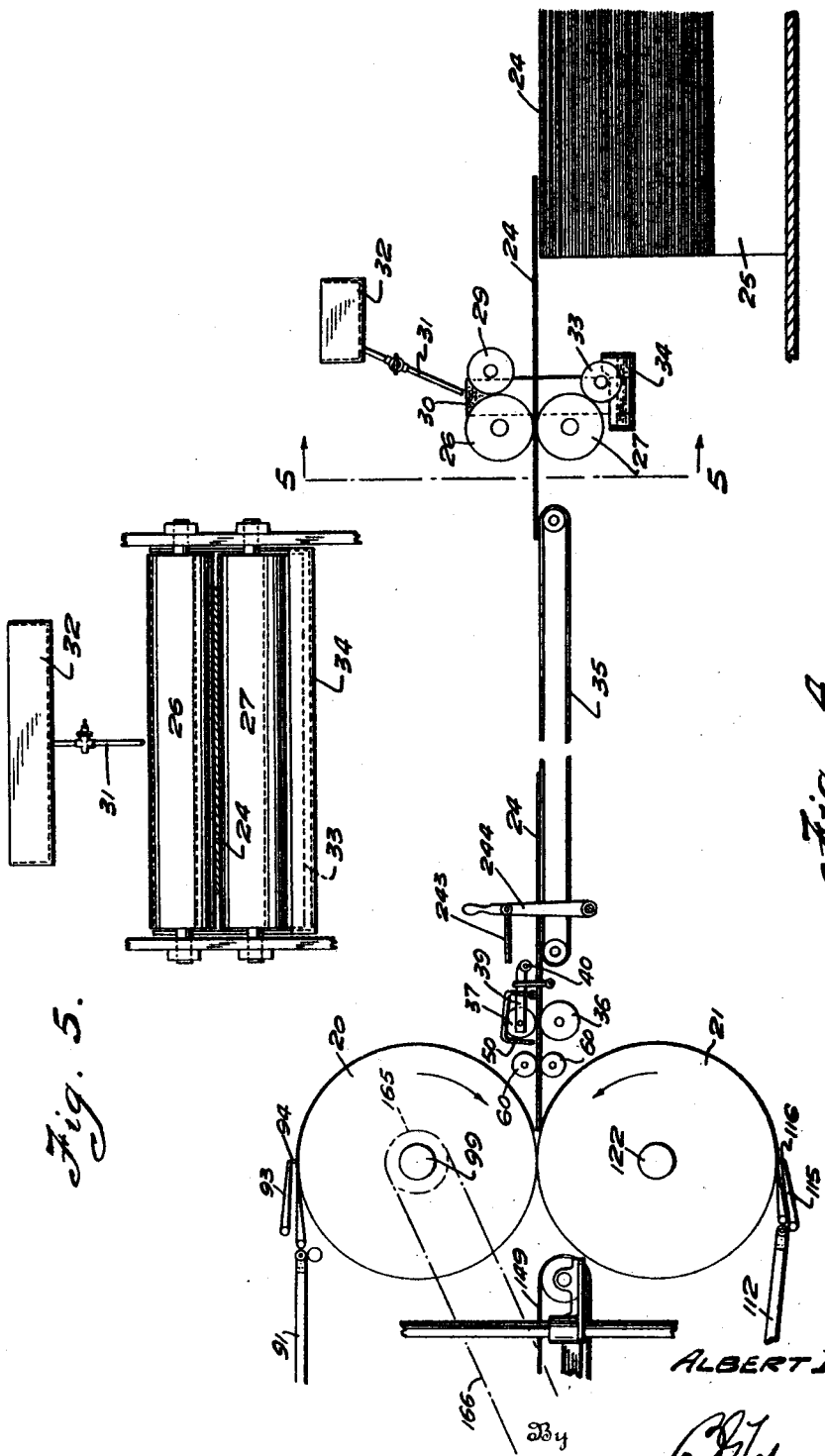
Inventor
ALBERT BROADMEYER
By
Attorney

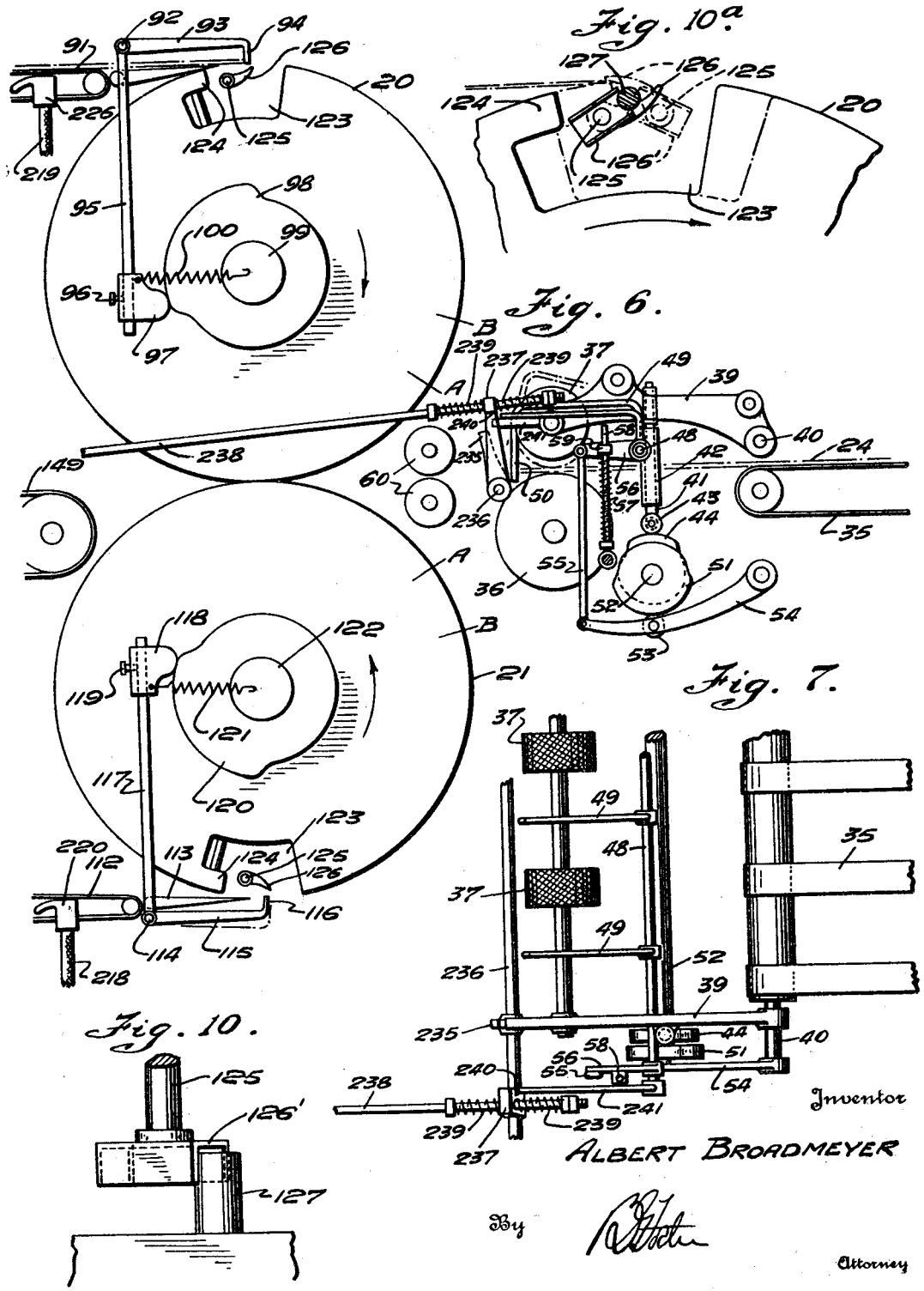

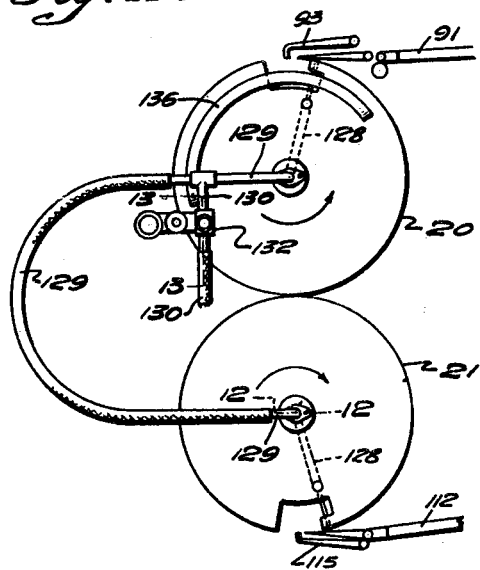
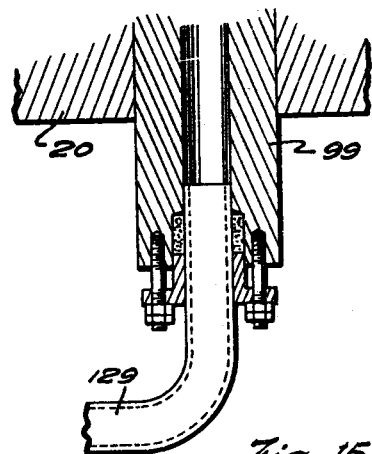
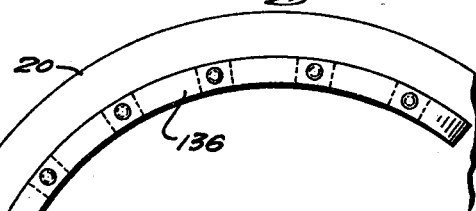
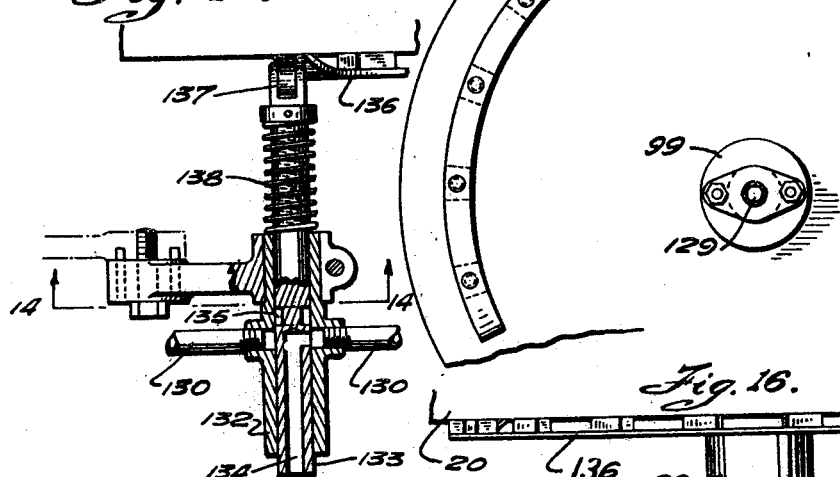
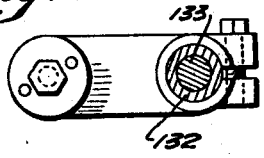

Inventor
ALBERT BROADMEYER
By
Attorney

Sept. 22, 1931.  A. BROADMEYER  1,823,876
SHEET MOUNTING APPARATUS
Filed Nov. 23, 1928   13 Sheets-Sheet 9
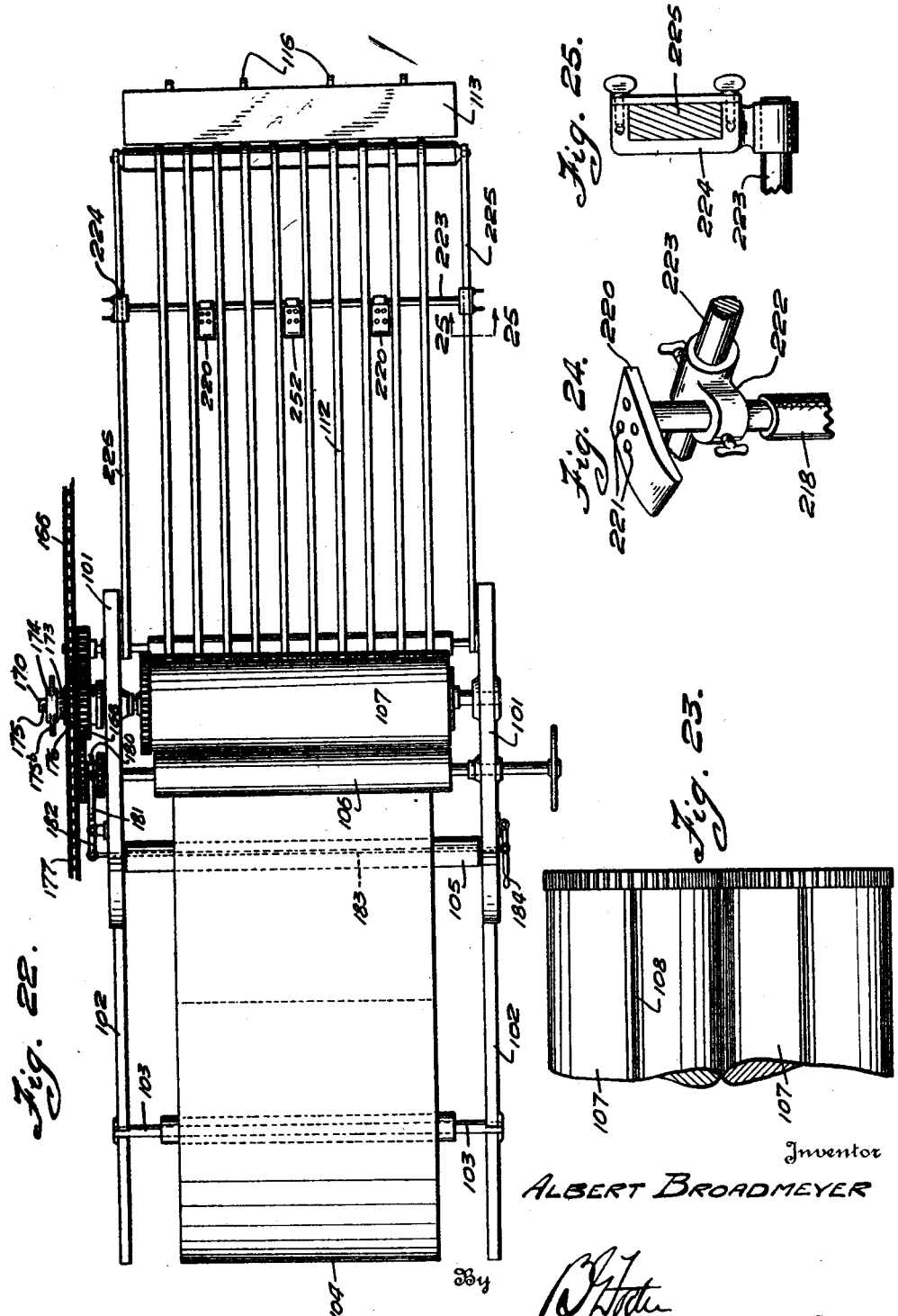
Inventor
ALBERT BROADMEYER
By
Attorney Sept. 22, 1931.  A. BROADMEYER  1,823,876
SHEET MOUNTING APPARATUS
Filed Nov. 23, 1928  13 Sheets-Sheet 10
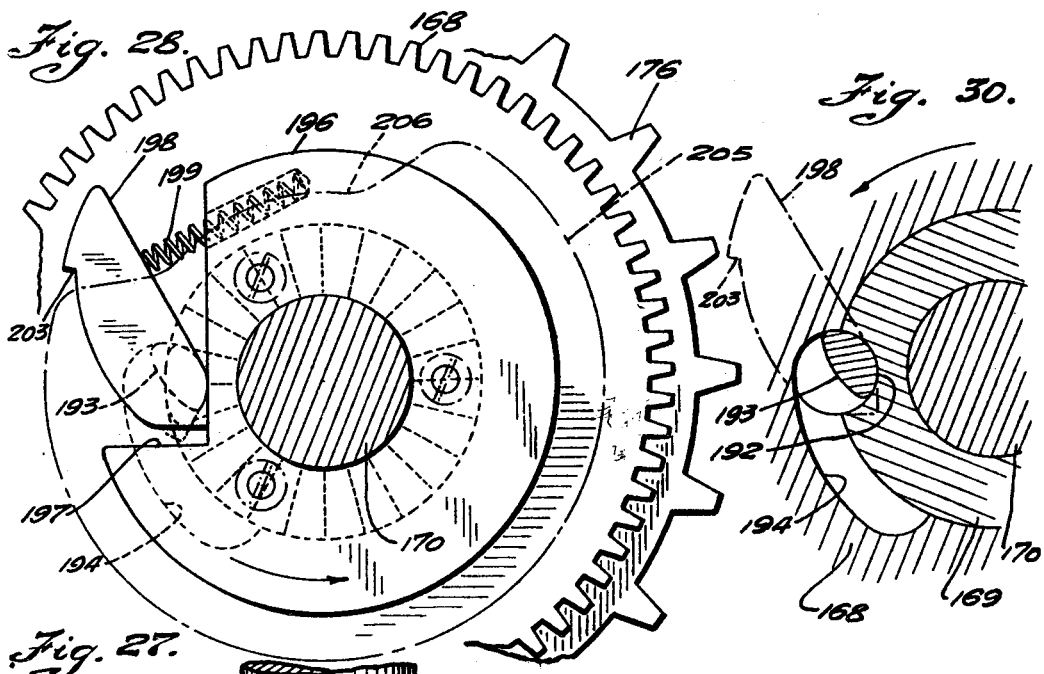
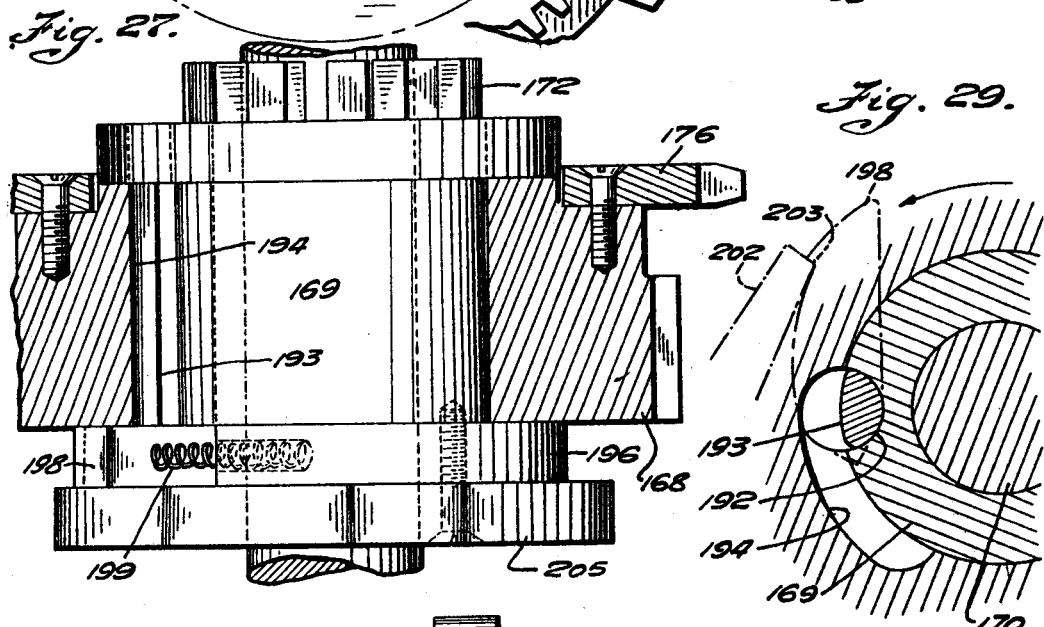
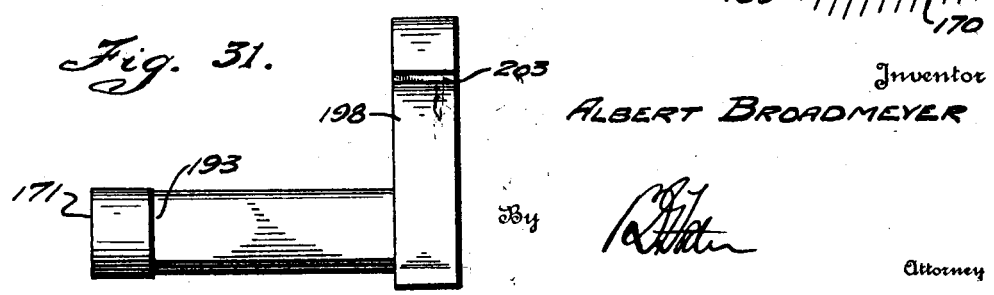
Inventor
ALBERT BROADMEYER Sept. 22, 1931.　　A. BROADMEYER　　1,823,876
SHEET MOUNTING APPARATUS
Filed Nov. 23, 1928　　13 Sheets-Sheet 11
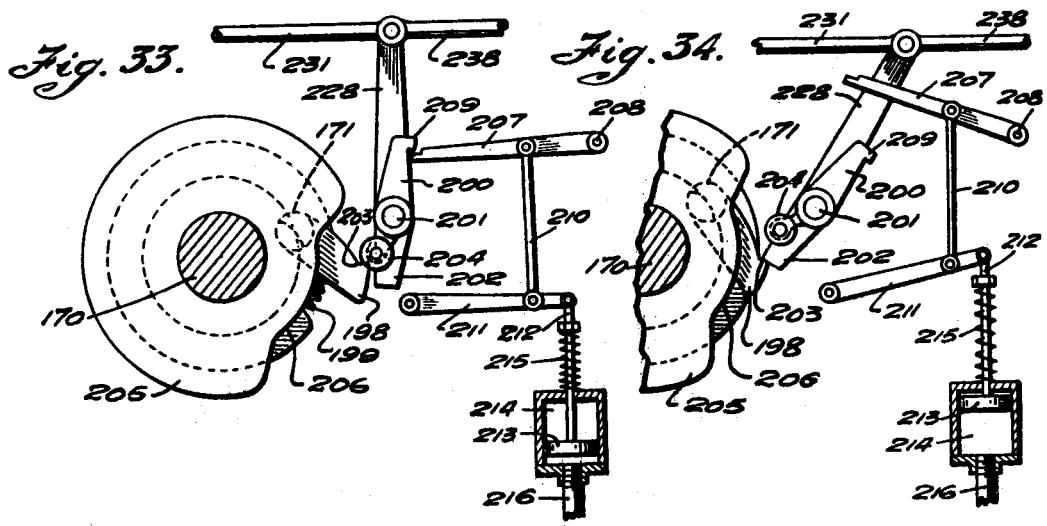
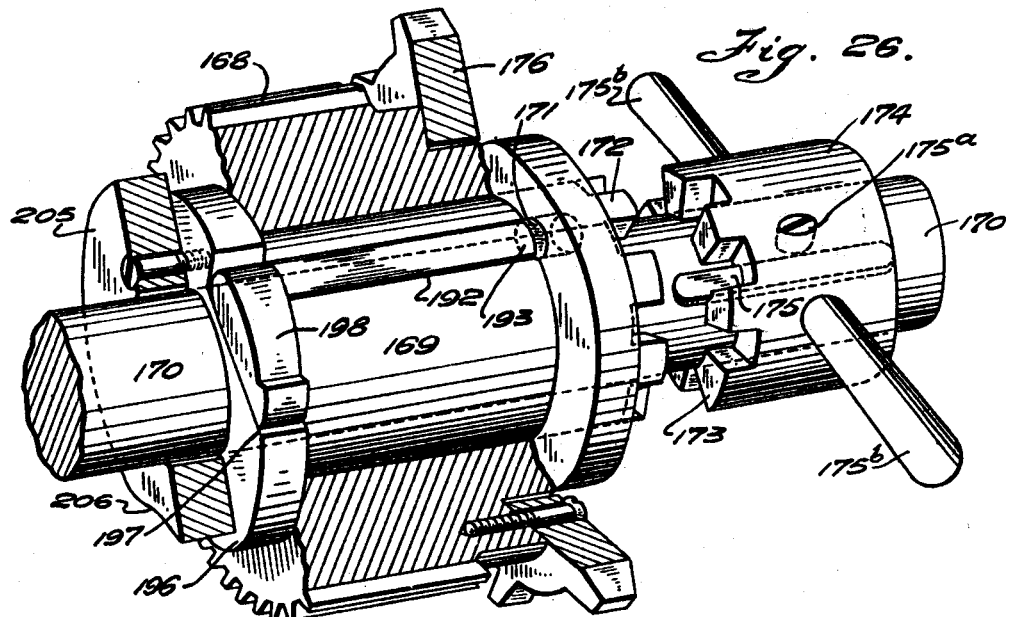
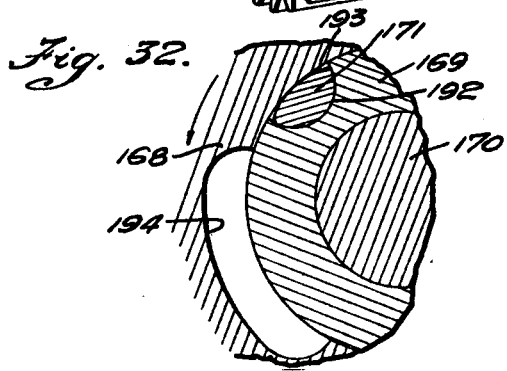
Inventor
ALBERT BROADMEYER
By
Attorney

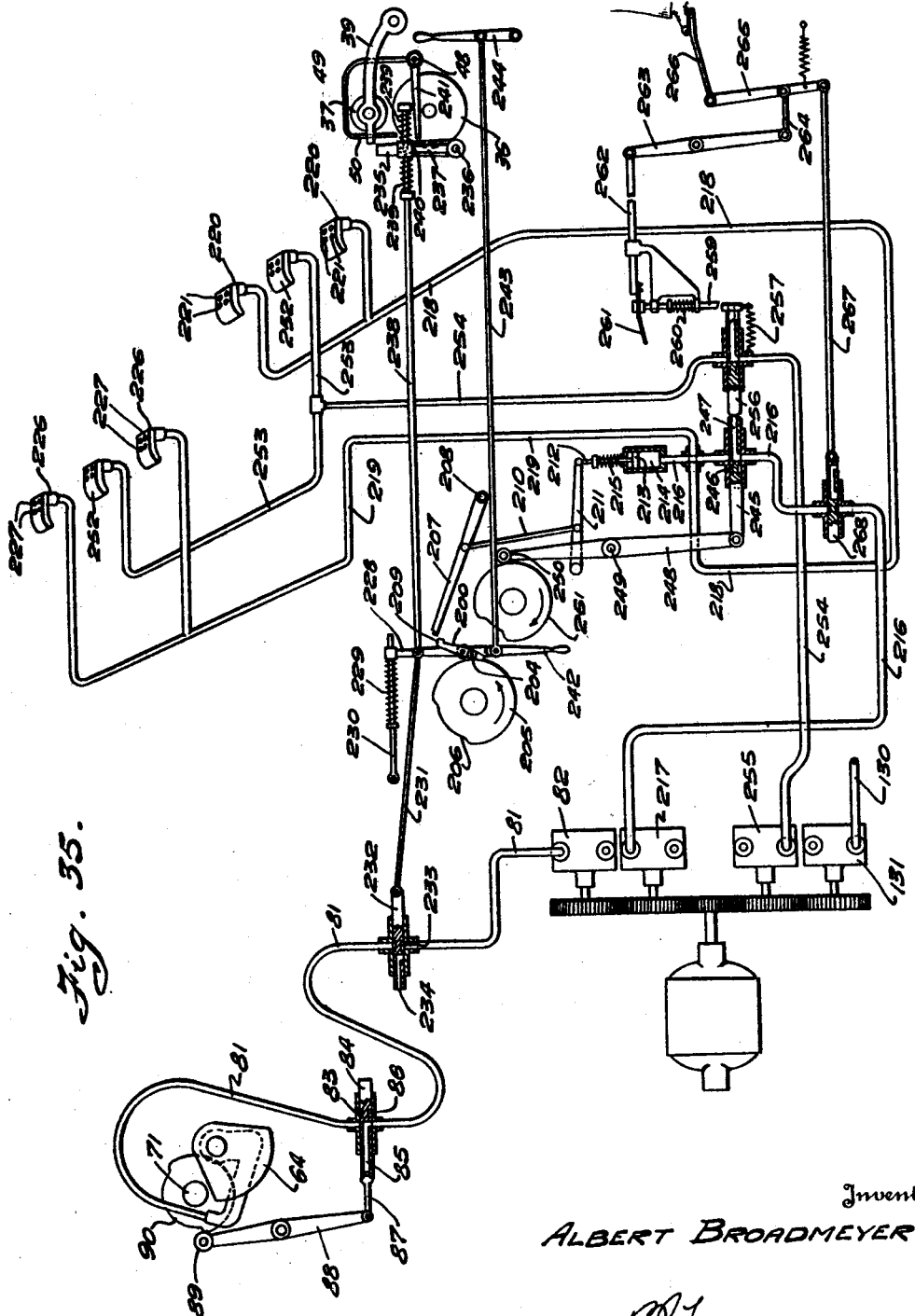

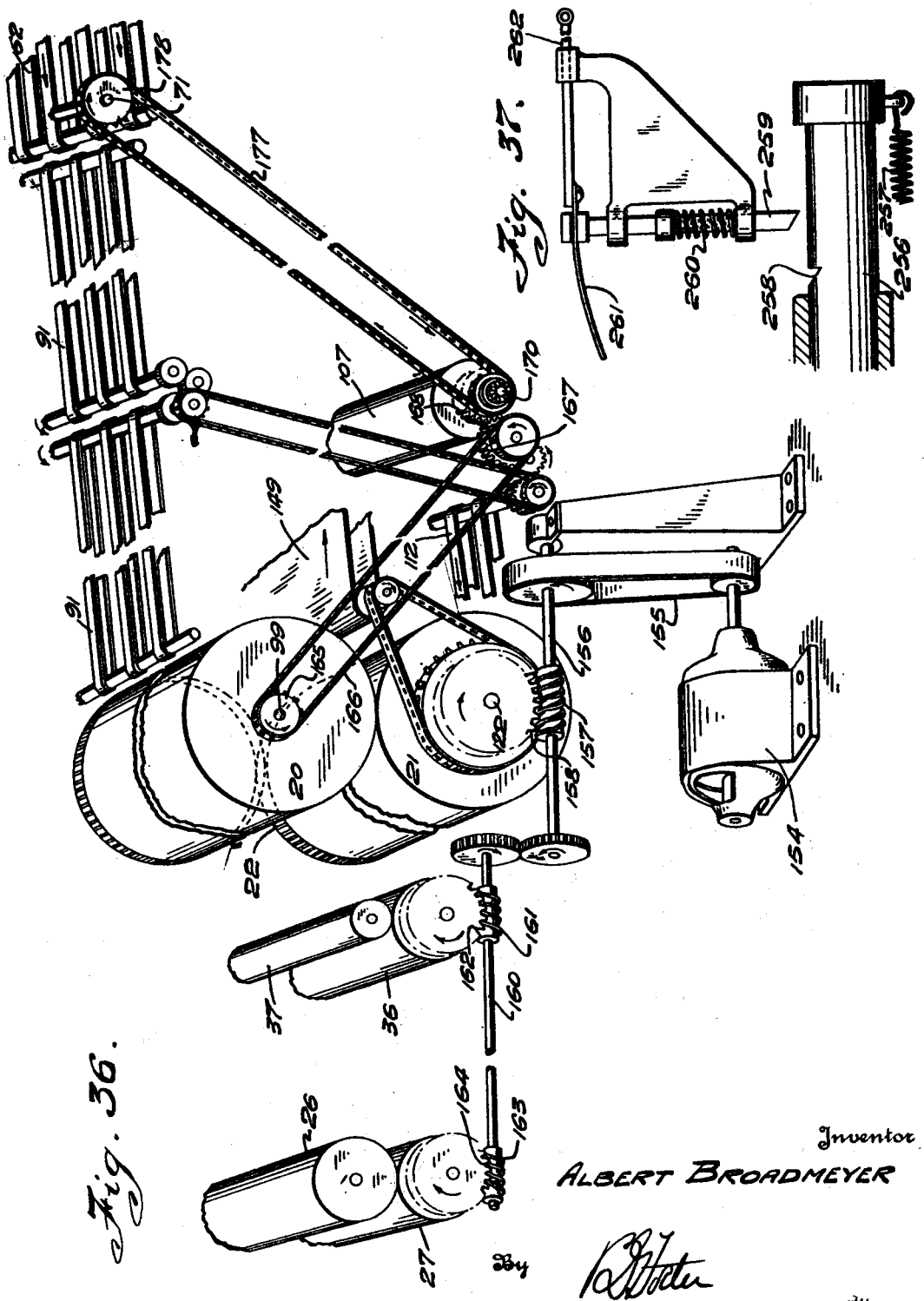

Patented Sept. 22, 1931

1,823,876

UNITED STATES PATENT OFFICE

ALBERT BROADMEYER, OF HARRISBURG, PENNSYLVANIA, ASSIGNOR TO W. O. HICKOK MANUFACTURING COMPANY, OF HARRISBURG, PENNSYLVANIA, A CORPORATION OF PENNSYLVANIA

SHEET MOUNTING APPARATUS

Application filed November 23, 1928. Serial No. 321,469.

The present invention relates to apparatus for mounting lithographed sheets and the like on heavied bodies, such as cardboard.

The primary object is to provide a novel apparatus that will effectively perform this mounting action with speed so that a large number of sheets may be mounted in a short space of time.

Inasmuch as a sheet mounted on one face of a cardboard will cause both to curl, another object is to provide novel means that will apply to the body or cardboard a backing sheet that will counteract this curling action and thus maintain finished products in flat condition.

Inasmuch as lithographed sheets are often very expensive they cannot be wasted, and a further and important object of the present invention is to provide apparatus that is both under the control of the sheets and also under the control of the operator, thus in turn controlling the apparatus so that wastage is reduced to a minimum.

The preferred embodiment of the invention is illustrated in the accompanying drawings, wherein:—

Figure 2 is a side elevation of the left hand portion of the machine.

Figure 1:
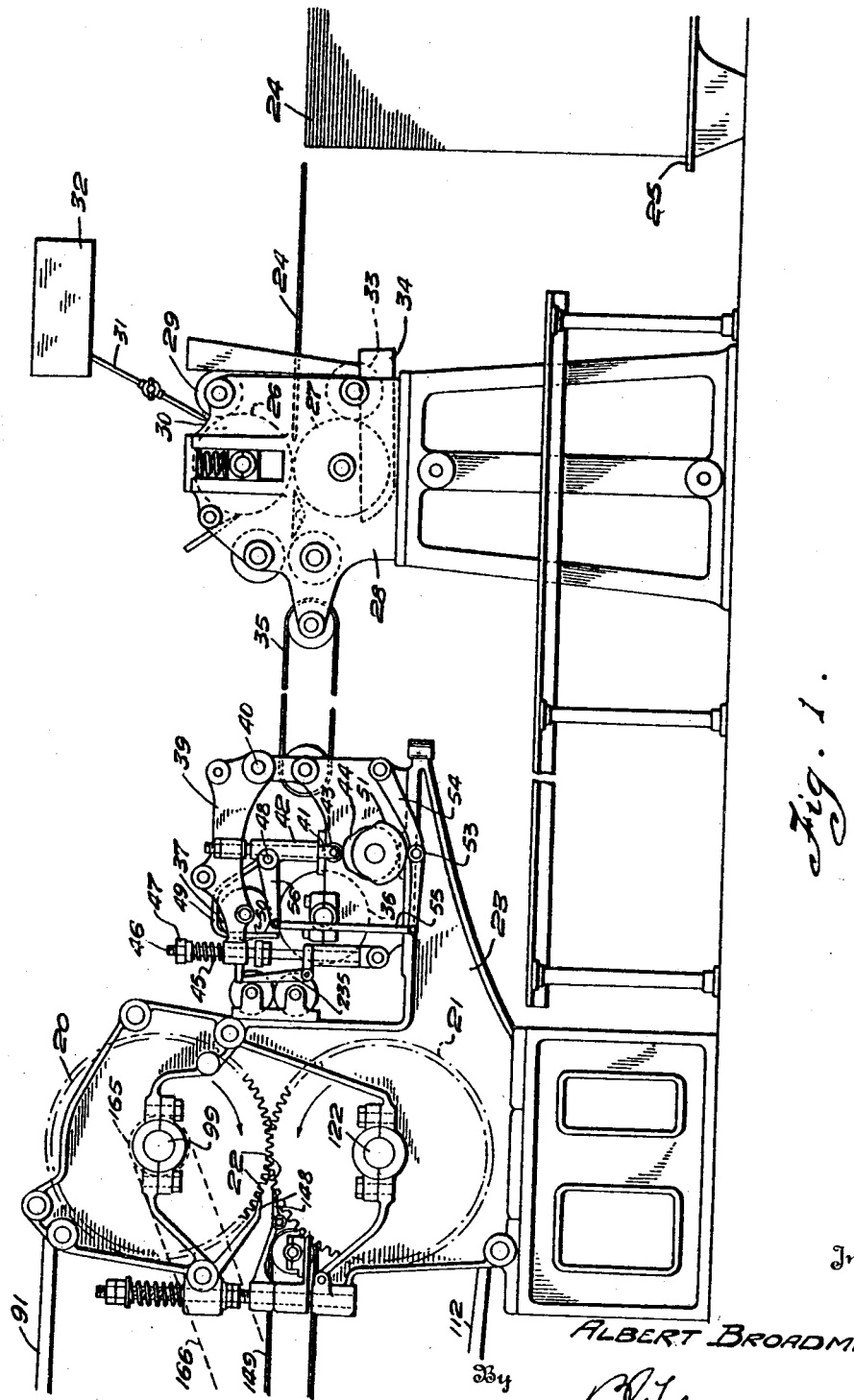
Figure 1 is a side elevation of the right hand portion of the machine.

(Figures 1 and 2 together show the complete apparatus in side elevation.)

Figure 3 is a view in elevation of the backing sheet cutting and supplying mechanism showing the side opposite to that illustrated in Figure 2.

Figure 4 is a longitudinal sectional view of the body sheet supplying, gluing and feeding mechanism.

Figure 5 is a cross sectional view on the line 5—5 of Figure 4.

Figure 6 is a view in end elevation of the coacting mounting cylinders and the gate mechanisms that control the delivery of the various sheets thereto.

Figure 7 is a plan view of a portion of the gate mechanism that controls the supply of body sheets to the mounting cylinders.

Figure 8:
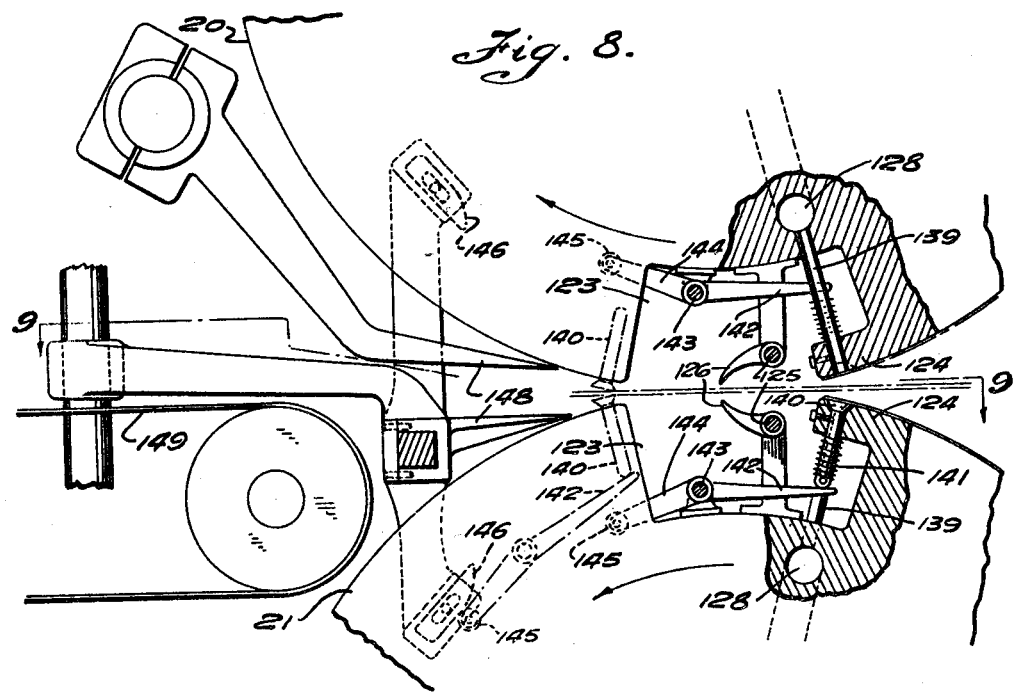

Figure 8 is a detail end elevation of the sheet gripping mechanisms of the mounting cylinders.

Figure 9:
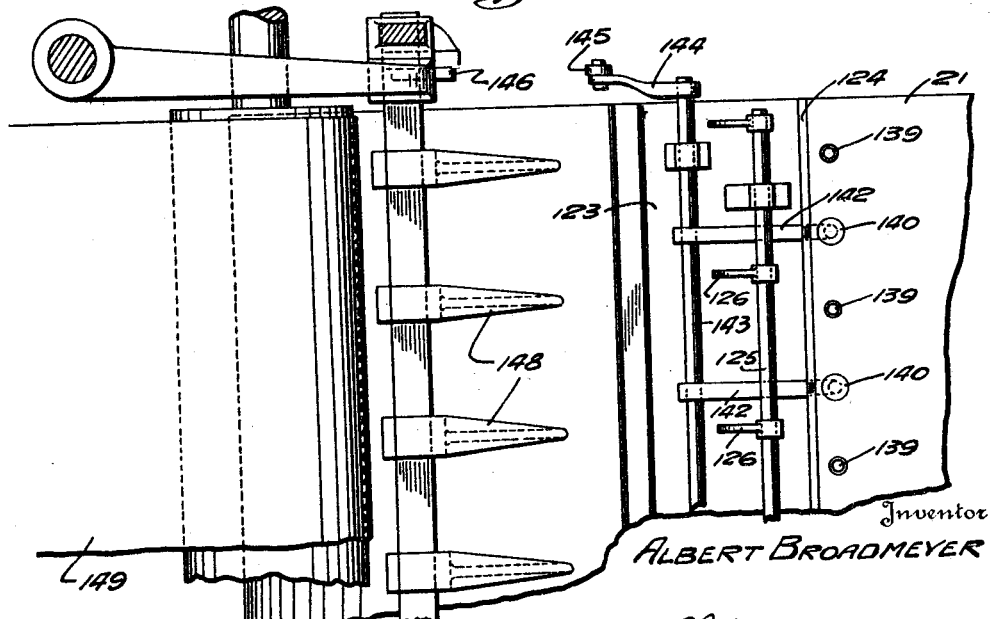

Figure 9 is a plan view of the sheet gripping mechanism of the lower mounting cylinder and the sheet guides associated with said cylinder and is on the line 9—9 of Figure 8.

Figure 10 is a detail view of one of the sheet gripper shifting devices.

Figure 11 is a view in end elevation of the suction mechanism that supplements the grippers in holding the sheets on the mounting cylinders.

Figure 12 is a detail section of the coupling between the suction line and one of the mounting cylinders and on the line 12—12 of Figure 11.

Figure 13 is a detail sectional view of the controlling valve for said suction mechanism and is taken on the line 13—13 of Figure 11.

Figure 14 is a detail section on the line 14—14 of Figure 13.

Figure 15 is a detail elevation of a portion of the upper mounting cylinder showing the cam track for operating the control valve of Figure 13.

Figure 16 is a detail plan view of said cam track.

Figure 17:
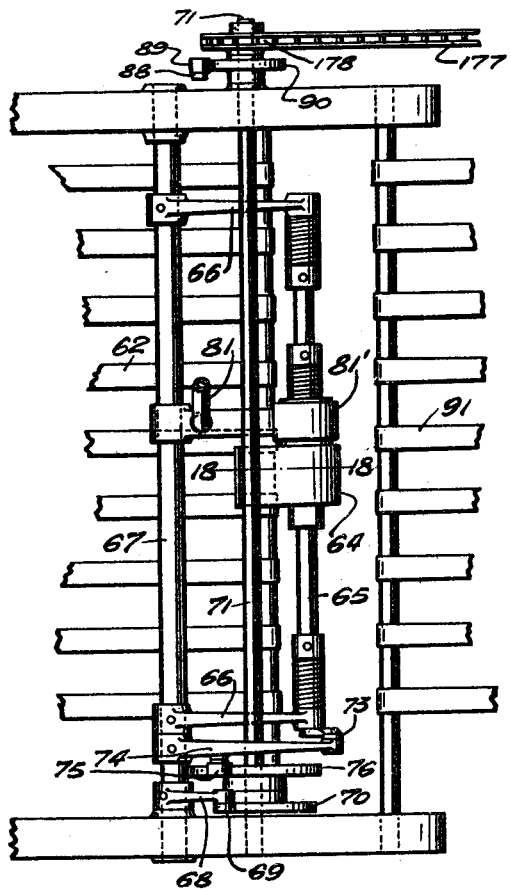

Figure 17 is a plan view of the feeding mechanism for the facing sheets.

Figure 18:
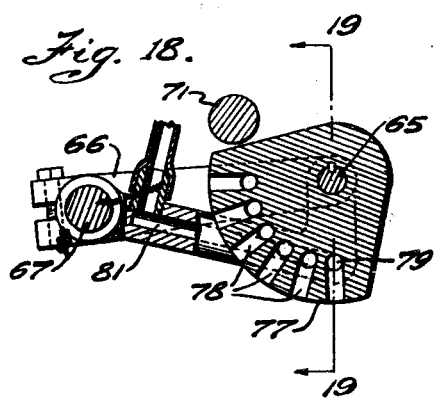

Figure 18 is a sectional view of the suction head for said feeder and on the line 18—18 of Figure 17.

Figure 19:
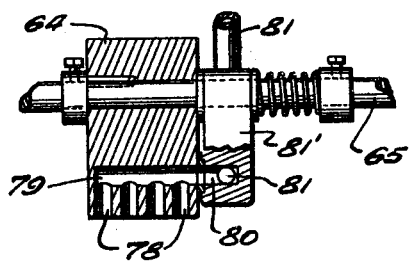

Figure 19 is a sectional view on the line 13—13 of Figure 12.

Figure 20:
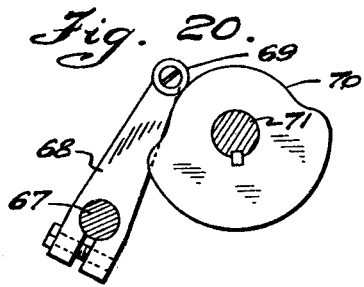

Figure 20 is a detail view in elevation of the cam mechanism for raising and lowering the suction head of Figures 17, 18 and 19.

Figure 21:
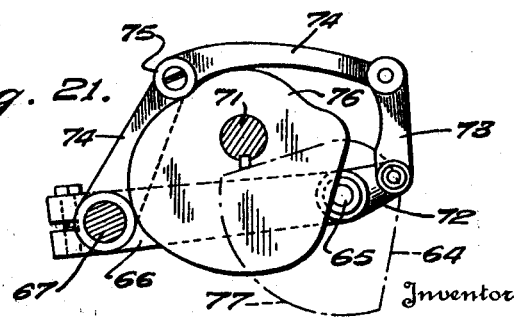

Figure 21 is a detail view in elevation of the cam mechanism for swinging said suction head.

Figure 22 is a plan view of the mechanism for cutting the back sheets and delivering them to the mounting cylinders (see Figure 3).

Figure 23 is a front elevation of end portions of the cutting cylinders.

Figure 24 is a detail perspective view of one of the suction shoes and a portion of its support.

Figure 25 is a detail sectional view on the line 25—25 of Figure 22, showing a mounting of the suction shoe support.

Figure 26 is a detail perspective view partly in section of the adjustable and automatic driving clutch mechanism for the cutting cylinders.

Figure 27 is a detail view in side elevation of the said clutch mechanism.

Figure 28 is a view in elevation of the left end of the clutch mechanism shown in Figure 27.

Figure 29 is a detail cross sectional view showing the clutch pawl in its inactive position.

Figure 30 is a similar detail sectional view but showing the pawl in its active position.

Figure 31 is a detail plan view of the clutch pawl per se.

Figure 32 is a detail cross section through the clutch mechanism showing the pawl inactive and the driving gear shoulder passed beyond the same.

Figure 33 is a view of the pawl controlling mechanism when holding the actuating dog inactive.

Figure 34 is a view similar to Figure 33 but showing the actuating dog released and moving the clutch pawl to its inactive position.

Figure 35 is a diagrammatic view illustrating the suction apparatus and the various instrumentalities controlling it and which it controls.

Figure 36 is a perspective view and also somewhat diagrammatic illustrating the driving mechanism of the machine.

Figure 37 is a detail of the supplemental suction controlling valve and its holding means.

In the embodiment disclosed, two coacting mounting rollers are employed, an upper roller or cylinder 20, and a lower roller or cylinder 21, the two rollers being geared together as illustrated at 22. These rollers are mounted in a suitable central or intermediate frame 23. A pile of cardboard 24 is shown at one end of the machine, and is mounted on a suitable table 25. The sheets from this pile are delivered in the present embodiment by hand to a pair of gluing or adhesive-applying rollers 26 and 27 journaled one above the other in another frame 28. As shown in Figures 1 and 4, the upper roller 26 has associated therewith, a roller 29 forming a trough 30 to which is delivered glue from a reservoir 32. The lower roller 27 has a glue-applying roller 33 contacting therewith and located in a reservoir 34. Obviously then the cardboard sheets that are successively passed between the rollers 26 and 27 have their opposite faces coated with glue or other suitable adhesives.

From this adhesive applying mechanism the sheets are delivered on to an endless conveyor, preferably made of endless bands, as chains 35 that carry said sheets toward the above mentioned mounting rollers 20—21, (see Figure 4).

Interposed between the conveyor 35 and the mounting rollers 20—21 is a lower feeding roller 36 with which cooperates a series of upper feeding rollers 37. These upper rollers 37 are carried by a shaft 38 mounted at its ends on crank arms 39. The crank arms 39 are in turn journaled at 40 and one of said crank arms carries a depending plunger 41 sliding in a guide sleeve 42. The lower end of this plunger has a roller bearing 43 on a rotating cam 44. A coiled spring 45 mounted on a rod 46 bears upon the arm 39 and thus urges it and the upper feeding rollers 37 downwardly, while the cam 44 as it rotates, periodically raises the rollers 37 against the action of the spring 45. The tension of the spring 45 can be varied by an adjusting nut 47 on the rod 46.

Associated with these feed rollers 36—37 is a feed controlling gate consisting of a rock shaft 48 having rearwardly extending finger hooks 49 terminating in downturned terminals 50 that are movable to and from a position in the path of the cardboard sheets 24. This movement of the gate fingers is accomplished by another cam 51 mounted on the same shaft 52 as is the cam 44. The cam 51 has riding against its lower side a roller 53 mounted on a swinging actuating arm 54. The arm 54 has a ling connection 55 with a crank arm 56 fixed to the rock shaft 48 that carries the gate finger 49. A coiled spring 57 mounted on an upper rod 58 bears against a lug 59 on the arm 56 and thus urges said arm and consequently the gate fingers upwardly. The cam 51, however, periodically pulls down the gate fingers against the action of this spring 57 but permits it periodically to act and raise the gate.

Between the feed rollers 36 and 37 and the mounting rollers 21—22 is preferably arranged a pair of guide rollers 60.

It will be evident then that as the cardboard sheets advance from the gluing mechanism they will be stopped by the gate fingers 50 (the feeding rollers 37 being now in their raised position). But at the proper time (as hereinafter explained) the gate fingers 50 are permitted by the cam 44 to rise, and the feeding rollers 37 are dropped upon the sheet. Said sheet is thus advanced to the guide rollers 60, and by them to and between the mounting rollers 20—21.

We will now consider the facing sheets—usually lithographed sheets—and the mechanism which operates on them. In the present structure a "continuous" feeder is employed. It is believed to be unnecessary to go into detail regarding such a structure because it is well known to those skilled in the art. It is thought therefore sufficient to state that an upper supply table 61 is provided, with a lower feed table 62 beneath it. The sheets are placed upon the upper table and are thence fed by any well-known mechanism illustrated at 63 to the lower table 62. The sheets are successively delivered from the lower table by the following mechanism.

An oscillatory suction head 64 is carried by a rock shaft 65 that overlies the discharge end of the table 62. This rock shaft is journaled in crank arms 66 fixed to another rock shaft 67 journaled in the frame of the machine. The rock shaft 67 has fixed to it a crank arm 68 provided on its free end with a roller 69 that rides a cam 70 fixed to a cam shaft 71. As a consequence the cam 71 periodically turns the rock shaft 67, raising the arms 66 and the rock shaft 65, also the suction head 64 carried by said rock shaft, and thereafter allows them to drop. The rock shaft 65 has a crank arm 72 connected by a link 73 with an actuating arm 74 journaled on the shaft 67. The arm 74 has a roller 75 that rides a cam 76 on the cam shaft 71. Therefore periodically the rock shaft is turned back and forth, giving a corresponding oscillatory movement to the suction head 64.

This suction head 64, as shown in Figures 18 has an arcuate surface 77 through which open suction ports 78 connected to passageways 79 to open through one end of the suction head 64. The open ends of said passageways 79 traverse a port 80 formed in a head 81' that is mounted on the shaft 65 adjacent to the end of the suction head 64, through which the passageways open. This port 80 is the end of a conduit 81 that leads to the suction or intake side of an air pump 82. In the conduit 81 is a suction-controlling valve comprising a valve casing 83 in which is a reciprocatory plunger valve 84 having a vent orifice 85 that is movable into communication with the portion of the conduit 81 leading to the pump 82 when said pump is cut off from communication with the suction head 64 by the valve 84. This valve also has a reduced portion 86 which is movable to and from a position to establish communication through the conduit 81 between the pump 82 and the suction head 64. The valve 84 has a link connection 87 with a lever 88 fulcrumed between its ends. Said lever carries on its free end a roller 89 engaged with the periphery of a cam 90 on the cam shaft 71.

It will be clear then that the valve 84 is periodically moved. The arrangement of the cams 70, 76 and 90 is such that when the suction head 64 is raised and is stationary, there is no vacuum in the portion of the conduit 81 that is connected or in communication with the suction head 64 because the valve 84 is closed and the vent 85 of the same is in communication with the pump 82. This lack of suction in the suction head continues until after the suction head is lowered upon the underlying end of the sheet. When it is so lowered, then the valve 85 is moved to a position where the reduced portion 86 will establish communication between the pump 82 and the suction head 64 by means of the conduit 81. Obviously therefore the sheet becomes attached to the suction head. This suction is maintained in the suction head 64 and said head is elevated so that the end of the sheet is carried up with it and thereafter while the suction is still maintained the suction head is caused to turn in a direction to start the sheet from the table 62 and on to a conveyor 91 that leads to the top of the upper mounting roller 20. It will be understood that in this action when the suction head 64 turns, the passageways 79 successively communicate with the port 80 of the conduit 81 so that the successive sets of ports have suction therein to keep the sheet attached to the head. When the head has been oscillated to its limit by the cam 76 and the sheet is in a position to be carried on by the conveyor 91, the suction is cut off to the head by the movement of the valve 84 to its relief position and the cam 76 now permits the suction head 64 to turn backwardly to its initial position. The parts are then in a position for the feeding of the next sheet.

Following the course of the lithographed sheet which is now being fed from the table 62 on to the conveyor 91 said sheet is carried by said conveyor to the top of the upper mounting roller 20. But here it meets an obstruction in the form of a gate. This gate consists of a transverse rock shaft 92 having stop fingers 93 with downturned terminals 94 that are in the path of the sheet. (See Figure 6.) The rock shaft has a depending arm 95, to the lower end of which is adjustably secured by a set screw 96, a bearing shoe 97. This shoe is engaged with the periphery of a cam 98 fixed on the shaft 99 of the upper mounting roller 20, and the cam is such that on each revolution of the roller 20 the fingers 94 will be depressed and thereafter will be elevated. A spring 100 serves to raise the fingers inasmuch as it is attached to the head 97.

The means for presenting the back sheet will now be described.

Beneath the conveyor 91 is a frame 101 including brackets 102 in which the shaft 103 of a roll of paper 104 can be mounted. The web of this paper is carried over a guide roller 105 journaled in the rear upper corner of the frame 101, and thence between three feed rollers 106 that are located one above the other and suitably journaled in the frame 101. Behind these feed rollers 106 are cutting rollers 107 that sever the web into separate sheets. Behind the cutting rollers are feed rollers comprising a lower roller 109 and pressure rollers 110 that rest upon the roller 109 and are carried by loosely swinging arms 111. Behind the lower roller 109 is the receiving end of a conveyor 112 leading to the lower side of the lower mounting roller 21. A sheet-directing plate 113 is interposed between the rear end of the conveyor 112 and said mounting roller 21. It will be clear then that as the web is cut into sheets, these sheets will be caught between the feed rollers 109 and 110, carried rearwardly on to the conveyor 112 and passed by said conveyor on to the plate 113. Here they strike a third gate. This gate comprises a rock shaft 114, carrying arms 115 having upstanding terminals 116 that are located in the path of the sheets. The rock shaft 114 has an upstanding arm 117 carrying a bearing shoe 118 that is adjustable on the arm 117 and is held by a set screw 119. The shoe 118 is held against the periphery of a cam 120 by a spring 121, and this cam is carried by the shaft or gudgeon 122 of the lower mounting roller 21.

From the above description taken in connection with the drawings, it will be seen that with the mechanisms properly timed (as they are) a sheet of cardboard is taken from the pile 24, glue is applied to its opposite faces and it is brought up against the gate stop fingers 50. At the same time, a lithographed sheet fed from the table 62 is brought against the upper gate 94, and a backing sheet, severed from the web of the roll of paper 104, is brought against the lower gate 116. These three gates are so positioned and timed that they are opened so as to bring the advance ends of the cardboard, lithographed and backing sheets into registration between the coacting portions of the mounting cylinders 20—21. These cylinders then unite the sheets and they are carried rearwardly by the mechanism hereinafter described.

It now becomes necessary to explain the means by which the facing and backing sheets are carried around the cylinders 20—21 to meet the cardboard. As this mechanism is the same in both cylinders 20—21 a description of one, it is believed, will be sufficient. Each cylinder has a recess 123 across its peripheral portion and on one side of such recess 123 is an overhanging flange 124. In the recess is a longitudinally disposed rock shaft 125 carrying grippers 126 that are adapted to lap over the flange 124 and thus clamp the front end of the sheet to the cylinder 20—21. The rock shaft 125 is provided at one end with a flanged guide shoe 125' adapted in well-known manner to engage pins 127 that successively throw the shaft in opposite directions and cause the grippers to move to an operative and then to an inoperative position. The shaft is of course actuated to grip the sheet that is against the gate 94 or 116, and it is actuated to release the sheet before the portion of the cylinder carrying the grippers moves to a point in association with the other cylinder. The position where the gripper opens is indicated at A in Figure 6. Inasmuch as the release of the sheets at this point would free said sheets so that they would not travel properly to position between the cylinders, the following supplemental attaching means is employed.

Each cylinder 20—21 is provided beneath the recess 123 with a longitudinal suction passageway 128 leading to the shaft of said cylinder, and connected to said passageways are the branches 129 of a suction conduit 130 that is connected to the intake side of an air pump 131. In the conduit 130 adjacent the end of the upper cylinder 20 is a controlling valve. This valve includes a casing 132 in which is a reciprocatory plunger valve 133. The plunger valve has a relief port 134 open at one end to atmosphere and having its other end movable into and out of communication with the conduit 130. It also has a reduced portion forming an annular passageway 135 that is adapted to establish communication through said conduit 130 when the valve is moved to one position. This movement is obtained by a cam track 136 fixed upon the adjacent end of the mounting cylinder 20 and adapted to ride on said track is a roller 137 journaled on the end of the valve 133. A spring 138 serves to hold the roller against the cam track 136 and also moves the valve to its relief position when permitted by the said cam track.

The cam track 136 is so disposed that the valve is actuated to create suction in the conduit 130 and passageways 128 just before the grippers are swung to open position, in other words suction is created when the grippers reach the point "B" in Figure 6. The said passageways 128 have suction nozzles or ports 139 opening through the flange 124. Therefore, it will be evident that as suction is created through the nozzles 139, before the grippers swing to their inactive positions, the sheets will be held against the cylinders after the said grippers become inactive and said sheets are carried on between the cylinders and into contact with the interposed glued cardboard. When the three sheets come into coaction then the pressure of the cylinders 20—21 is sufficient to carry them on and press them together.

It has been found, however, that there is some danger of the completed article adhering to one or the other of the said cylinders 20—21. Means are therefore provided to prevent this and secure the passage of the sheets in a rectilinear direction. To this end, between the nozzles or ports 139 are disengaging or ejecting plungers 140 that are mounted to reciprocate in the flanges 124 and carry coiled springs 141 that urge them inwardly against the ends of fingers 142. These fingers are mounted on rock shafts 143 and each of said rock shafts at one end is provided with a crank arm 144 having a roller 145 journaled on its free end. The roller 145 is adapted to contact with a cam finger 146 fixed on a bracket 147. Therefore, as the flange portions 124 of the cylinders pass away from each other the rollers 145 strike the cam fingers 146, causing the fingers 142 to be pressed outwardly and pushing the ejecting plungers outwardly as indicated in dotted lines in Figure 8.

The article, which may now be considered completed, passes from the rollers between guide fingers 148 and thence to a conveyor 149. This conveyor operates between the upper conveyor 91 and the lower cutting mechanism and delivers to a piling mechanism that is placed beneath the tables 61 and 62. It is believed to be unnecessary to go into detail regarding this piling mechanism. It may be of any desired character, but preferably includes a table 150 that is automatically lowered as the pile thereon increases. One incidental feature may, however, be noted. As the sheets are relatively moist it has been found that they cannot be simply slid one over the other because they the apt to injure each other. Therefore means are provided for supporting the incoming sheet in spaced relations to the topmost of the underlying pile until it is in a position to be dropped on the pile. As shown, endless belt supports 151 are mounted on rollers 152 and are located over the table 150. These belts have hanger hooks 153 and on the lower stretch they are faced in opposition to the sheets brought in by the conveyor 149. It consequently follows the advance end of a sheet is caught by one set of the depending hooks 153 and the conveyor, pushing the sheet, also pushes these hooks and belts 151 so that the rear end of the sheet drops first onto the pile. The front end remains supported by the hooks until the next sheet is delivered and as this starts the belts again, the front end of the held sheet becomes detached from the hook and falls. There is therefore no scraping or sliding of one sheet against the other.

We will now consider the driving mechanism for the various instrumentalities above described.

The prime mover is shown as a motor 154, the drive shaft of which is belted, as shown at 155 to a worm shaft 156. A worm 157 on the shaft 156 meshes with a worm wheel 158 fastened to the shaft 122 of the lower mounting cylinder 21 and as the cylinders 20—21 are geared together, as already explained, these two mounting cylinders are thus driven. The shaft 156 is also geared as illustrated at 159 to another shaft 160 and said shaft 160 carries a worm 161 that is in mesh with a worm wheel 162 fastened to the lower feed roller 36. The shaft 160 extends to the gluing rollers where a worm 163 mounted thereon is in mesh with a worm wheel 164 fastened to the lower of said gluing rollers.

Mounted on the shaft 99 of the upper mounting cylinder 20 is a sprocket wheel 165, around which passes a sprocket chain 166 that drives an idler gear 167 adjacent to the upper cutting roller 107. The idler gear is in mesh with a driving gear 168 that is journaled on a bushing or sleeve 169, said bushing 169 being in turn rotatable upon a shaft 170 to which the upper cutting cylinder or roller 107 is fast. Ordinarily the gear 168 is fast to the bushing 169 by means of a clutch key 171 (this key and its operation is hereinafter more fully described). The bushing 169 is ordinarily clutched to the shaft 170 by reason of teeth 172 formed on its outer end which teeth interfit with other teeth 173 formed upon the opposing end of a sliding clutch head 174 keyed as indicated at 175 to the shaft 170. It will be clear that when the gear wheel 168 is clutched to the bushing 169 and the bushing 169 is connected to the shaft 170 by the head 174, the upper cutting roller will be driven and as this cutting roller is geared to the lower roller, the latter will be rotated with it.

The gear wheel 168 has fastened to it a sprocket wheel 176 which drives a sprocket chain 177 and this sprocket chain passes about and rotates a sprocket wheel 178 fastened to the cam shaft 71 of the facing sheet feeder.

The drive of the three feeding rollers 106 that deliver the web from the paper roll 104 to the cutting rollers 107 is of the changeable speed type. The lower roller 106 has on its shaft a gear 179 that can be clutched thereto or disengaged therefrom by the clutch mechanism 180. This clutch mechanism includes a yoke 181 engaged with the movable member of the clutch and forming a part of a lever 182. This lever 182 has connected to it by a link 183, a handle lever 184 mounted on a convenient portion of the machine. The gear 179 is in mesh with an adjustable idler gear 185 journaled on a pintle 186 carried by a box 187 adjustable in an arcuate mounting 188. The shaft of the lower cutting roller or cylinder 107 has a gear 189 detachably mounted thereon, being held by a suitable nut 190. Gears 189 of different diameters may be employed. Consequently it will be evident that the feed rollers 106 can be driven at different speeds with respect to the cutting cylinders. The take off rollers 109 and 110 for for the cutting cylinders 107 are driven from the lowermost feed roller 106 by a sprocket chain 191 and it will be noted that the take off rollers are driven at a higher rate of speed than the feed rollers by reason of the sprocket gearing shown.

With this construction, the web of paper is actually moved by the feed rollers 106 and the cutting rollers 107 do not operate to move the web. As a matter of fact these cutting rollers are preferably spaced a distance apart to permit the movement of the web freely between them. When the knife 108 of the cutting rollers severs the web, the front end thereof is engaged by the rollers 109 and 110 and consequently the cut sheet is pulled away from the cutting cylinders and from the advancing front end of the web. The change speed gear therefore is employed to vary the speed of the feeding rollers 106 in order that the cutting cylinder can sever the web into sheets of different lengths. But to do this it becomes necessary to adjust the position of the cutter 108 with respect to the length of the sheet to be cut. Consequently the adjustable clutch connection 172—173 is provided between the driving gear 168 and the shaft 170 of the upper cutter roller 107. That is to say, when it is desired to alter the relation of parts, the set screw 175ª, which holds the collar 174 fast to the shaft 170 is loosened, the collar 174 is moved outwardly until the teeth 173 are withdrawn from the teeth 172 and as said collar is provided with handles 175ᵇ and is keyed at 175 to the shaft 170, by turning the handles 175ᵇ, the two cutter cylinders can be turned and thus adjusted with relation to the feed rollers.

It is understood that when so adjusted the change speed gearing to the feed rollers 106 is unclutched at 179.

As outlined in the primary portion of the specification this machine is often used to mount valuable lithographed sheets that may cost several dollars each. For practical purposes therefore it is highly desirable that the machine be under such control that there is little if any wastage. Mechanism therefore is provided which takes care of any failure of feed or other untoward conditions that may arise.

Reference has already been made to the fact that the driving gear 168 which operates the cutting cylinders is ordinarily coupled to the bushing 169 by the clutch key 171 and that the bushing in turn is fastened to the driving shaft 170 of the cylinder 107 by the adjusting collar 174. The key 171 is in the form of a rock shaft that is fitted in a recess 192 formed in the face of the bushing 169 and extending longitudinally thereof. The outer side of this rock shaft is cut away as shown at 193 and is adapted to move to a position so that the face thereof is coincident with the face of the bushing 169. When so positioned the driving gear 168 can rotate freely on the bushing 169. The clutch key 171 can, however, be turned so that one side projects beyond the face of the bushing 169 and the interior of the gear wheel 168 has an elongated socket 194 that receives the projecting portion. One end of this socket constitutes an abutment against which the projecting portion of the clutch key engages and thus a drive connection is established between the gear wheel 168 and the bushing. The inner end of the bushing 169 is flanged as shown at 196 and is provided with a socket 197. One end of the clutch key 171 engages in this socket and has fastened thereto a trip-arm 198. Pressing against the rear side of the trip-arm is a coiled spring 199 located in a socket in the bushing 169 and its flange 196. The spring thus serves to urge the clutch key into its projecting or active position.

Located alongside the flange 196 of the bushing is an actuating dog 200 pivoted as shown at 201 and having one end 202 adapted under certain circumstances to swing into the path of a shoulder hook 203 formed on the free end of the arm 198 of the clutch pawl 171. The dog 200 carries a roller 204 that rides the periphery of a cam 205 fastened to the shaft 170 and this cam has a cut-away portion 206 adjacent to the arm 198 so that the end 202 of the dog is permitted to move inwardly to a position to catch the hook 203 and force the arm 198 rearwardly so that the clutch pawl 171 is turned to its inactive position. When, however, the machine is operating properly and the sheets are being fed in correctly timed relation then the dog 200 is prevented from acting on the clutch pawl arm 198. This is accomplished as follows:

A holding arm 207 is pivoted at one end, as shown at 208 and its free end is adapted to swing into and out of the path of a nib 209 formed on the outer end of the dog 200. The arm 207 is connected by a link 210 to a lever 211 and this lever is pivotally connected to the rod 212 of a piston 213. The piston is reciprocable in a vacuum cylinder 214 and is normally held at one end of the same by a coiled spring 215 surrounding the piston rod 212 and urging it outwardly. This action as shown diagrammatically in Figure 35 normally holds the arm 207 out of the path of the nib 209 of the dog 200. The vacuum cylinder 214 has a conduit connection 216 with the intake side of an air pump 217. Leading from the conduit 216 adjacent to the cylinder 214 are two relief branches 218 and 219. The branch 218 terminates in suction shoes 220 having relief ports 221 in their upper faces. The shoes 220 are disposed in advance of the gate 115 and are located between the upper stretches of the feed tapes 112 for the cut sheets. As shown in Figure 6, the shoes 220 are preferably mounted in brackets 222 carried by a cross rod 223. This rod is fastened at its ends to sliders 224 that are movable along supporting bars 225. Thus the position of the shoes can be changed as desired. And it will be evident that as the cut sheets pass over these shoes toward the gate 116 they close the vent orifices 221.

Similarly the branch 219 leads to suction shoes 226 having vent orifices 227. These shoes 226 are mounted similarly to the shoes 220 and are located in advance of the gate 94 and between the tapes of the upper conveyor 91 that deliver the facing sheets from the continuous feeder.

If then the conduit 216 and branches 218 and 219 are open to the pump 217 it will be evident that if sheets are brought up to the gates 94 and 116, the relief ports 221 of the shoes 220 and the relief ports 227 of the shoes 226 are closed. Consequently vacuum will be established in the cylinder 214 and the piston 123 will be pressed downwardly against the action of the spring 215. Hence the arm 207 will be drawn downwardly into the path of the nib 209 of the dog 200 and when the inset portion 206 of the cam 205 traverses the roller 204, obviously the dog 200 cannot swing into the path of the hook 203 of the arm 198 of the clutch pawl 171. Consequently the clutch pawl 171 will maintain its active position. Should, however, either conveyor 91 or 112 fail to bring up a sheet at the proper time or should a sheet be so crooked as to leave exposed any one of the suction shoes 220 or 226. then the vent ports of that exposed shoe being open, will supply sufficient air to the pump 217 so that vacuum will not be created in the cylinder 214 sufficient to move the piston. When this occurs the piston remaining unmoved, the arm 207 stays in the position illustrated in diagrammatic Figure 34. Consequently the dog 200 can swing so that its end 202 will engage the shoulder 203 of the arm 198 and turn the clutch pawl 171 to its inactive position. When this occurs, the cutting cylinders become inactive and the feed of paper thereto is stopped.

Incidentally the shoes 220 and 226 perform another important function in that they serve as retarders for the oncoming sheets. In other words when in actual operation the sheets travel on the conveyors at relatively high rates of speed. Therefore if they should strike the gates at that high speed they are apt to be crumpled or to rebound away from the gates. The suction through the shoes causes said shoes to act as brakes or retarders that stop the sheets before they strike the gates. This is preferably done when the advance edges of the sheets are about two inches from the gates. The suction is however almost immediately relieved and the conveyors then bring the sheets to the gates but obviously at low speed because they have not yet obtained momentum.

The failure of either sheet to reach a gate at the proper time also is caused to control the feed of the facing or lithographed sheets. Fixed to the dog 200 and swinging therewith is a lever 228, one end of which is borne against by a spring 229 mounted on a carrier rod 230. This lever has a link connection 231 with a reciprocatory plunger valve 232 located in the conduit 81 through which suction is created in the suction feed roller 64. The valve 232 has a reduced portion 233 that permits air to pass through the conduit 81 from the suction feeder 64 to the pump 82 and it also has a vent or relief port 234 that can be moved to a position to vent the pump 82 to atmosphere when the valve closes off communication with the feeder head 64. If the dog 200 is held by the arm 207 the valve 232 remains inactive so that the pump 82 can perform its feeding function on the suction feeder 64, but if the dog 200 is allowed to turn and disconnect the clutch of the cutting cylinders it also causes the valve 232 to move so as to cut off communication with the pump 82 to the feeder head 64 and vent the pump to atmosphere. The feeder is then inoperative.

A third control that this mechanism effects is the feed of the glued cardboard or body sheet to the mounting cylinders 20—21. To this end a holding dog 235 is mounted on a rock shaft 236 and is adapted to swing under the free end of the arm 39 which supports the upper feed rollers 37. This rock shaft 236 is provided with a crank arm 237 through which passes an operating rod 238 pivoted to the lever 228. Springs 239 are mounted on the rod 238 on opposite sides of the crank arm 237 and bear against the arm. The crank arm 237 is furthermore provided with a shoulder 240 that is adapted to move over a finger 241 fixed to the rock shaft 48 that carries the gate arms 49—50. When therefore the dog 200 and lever 228 swing and the feed of the facing and backing sheets is thereby prohibited, the arm 237 will move over the finger 241 and prevent the gate 20 being raised by the spring 57 so that the cardboard sheet against said gate cannot pass on to the mounting cylinders 20—21. At the same time, the feed rollers 37 are held from dropping on the feed roller 36 by the arm 235 moving to a position beneath the arm 39 and therefore the glued cardboard is not passed onwardly.

Whenever the three feed mechanisms are thus brought to a standstill, it will be understood that it does not affect the operation of the mounting cylinders 20—21, the conveyor that carries the finished product away from the same, nor the receiver for such finished products and therefore these mechanisms will continue their operations on the articles that have been properly built up. This is important particularly since the stopping of freshly glued together sheets in partially associated or completed relation would be apt to affect said sheets and perhaps ruin them. When an automatic stoppage of the feeding mechanisms as above described takes place, they can be again thrown into operation at will. To this end the lever 228 preferably has one end formed into a handle grip 242 and it may also have a link conection 243 with another handle lever 244 arranged adjacent to the operator who feeds the cardboard. By moving either of these levers the dog 200 can be swung out of engagement with the clutch pawl arm 198, thereby releasing the same so that the spring 199 can act to turn the clutch pawl 171 into its projecting and active position when the gear 168 has turned sufficiently far to bring its recess over said clutch pawl.

Inasmuch as the suction created through the shoes 220 and 226 is sufficient to hold the sheets against movement, it becomes necessary to cut off the suction periodically to permit the sheets to be advanced beyond the gates. To this end in the conduit 216 is located a reciprocatory plunger valve 245 having a position 246 that permits communication between pump 217 and the branches 218—219. This valve also has a relief port 247 that is movable to a position to open the conduit 216 to atmosphere when the valve 245 cuts off communication with the branches 218 and 219. The valve 245 is connected to a lever 248 fulcrumed between its ends at 249 and carrying at its free end a roller 250 that is engaged by a cam 251. This cam is so timed that suction is created through the shoes 220 and 226 when sheets move over the same and approach the gates and thereafter the suction is released to permit the advance of the sheets when the gates are opened.

Associated with the shoes 220 and 226 are supplemental suction shoes 252 connected by branches 253 to a conduit 254 that is connected to the intake side of a fourth air pump 255. In the conduit 254 is another reciprocatory valve 256 that is abutted by the valve 245 so as to normally operate in synchronism therewith. It is held in its abutted relation by a spring 257. Ordinarily, therefore, it will be clear that the two valves 245 and 256 are together actuated by the lever 248 and the cam 251, so that the shoes 252 cooperate in their action with the shoes 220 and 226. It sometimes happens that it is desirable to hold the sheets against movement and yet permit the gates to operate. This is accomplished by means of the shoes 252 for the valve 256 can be held irrespective of the operation of the valve 245. For this purpose the valve 256 has at its free end a holding notch 258, in which a latch 259 can be engaged. This latch is normally held out of engagement by a coiled spring 260 surrounding and bearing against it. The latch in turn is slidably engaged with a leaf spring 261 that is slidable transversely to it and is inclined with respect thereto. This spring 261 is carried by a reciprocatory bar 262 connected to one end of a lever 263. The other end of the lever has a link connection 264 with the depending arm 265 of a foot treadle 266. When the foot treadle is depressed the bar 262 is moved in a direction to carry the spring 261 so as to force the latch 259 toward the valve 256, the spring 261 being stronger than the spring 260. Therefore, when the valve 266 is pushed to its open position the latch 259 will engage in the said notch 258 and hold the valve in open position, the spring 257 being in turn stronger than the spring 260. Obviously therefore, suction will be continued through the shoes 252 and any sheets over the same will be held even though the gates continue their opening operations. When the foot treadle 266 is released the bar 262 will be moved in a direction to raise the latch 259 and release the valve 256, whereupon it will again begin to operate with the valve 245.

Connected by a link 267 to the arm 265 of the treadle 266 is a valve 268 that is in the main suction line 216. Ordinarily this valve is open to permit the suction through the shoes 220 and 226 and its automatic control by the valve 245 as above described. But when the treadle 266 is operated to hold the valve 256 and secure constant suction through the shoes 252, then the suction line 216 is closed by the valve 268. As a result the plunger 213 becomes idle and as above explained the clutch 193 is made inactive while the feeder 64 is also stopped.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In a sheet mounting apparatus, the combination with means for pressing together a plurality of sheets, of means for delivering a plurality of sheets to the sheet pressing means, gate mechanism for controlling the delivery of sheets to the pressing means, and means for periodically operating the gate mechanism to insure the sheets being delivered to the pressing means in associated and predetermined timed relation.

2. In a sheet mounting apparatus, the combination with rotatable sheet pressing cylinders, of means for feeding sets of separate sheets thereto, and gate mechanism for controlling the delivery of the sheets to the cylinders to secure their being operated on in predetermined associated relation.

3. In a sheet mounting apparatus, the combination with rotatable sheet pressing cylinders, of means for feeding sets of separate sheets thereto, a gate for each set of sheets, and means for operating the gates in predetermined timed relation.

4. In a sheet mounting apparatus, the combination with rotatable coacting sheet pressing members, of means for feeding sheets toward the coacting sides of the member to pass therebetween, means for feeding another set of sheets around one of the members to bring the sheets of the two sets into coacting relation, a gate for controlling the delivery of the sheets of each set, and means for actuating the gates in predetermined timed relation.

5. In a sheet mounting apparatus, the combination with rotatable coacting pressing members, of means for delivering sheets to both members to be carried about said members and be brought into cooperative relation between them, gate mechanism for controlling the delivery of the sheets, and mechanism for periodically operating the gate mechanism to release the sheets and insure their being brought into predetermined cooperative relation as they pass between the members.

6. In a sheet mounting apparatus, the combination with rotatable coacting pressing cylinders having sheet gripping means, of means for feeding sheets to the outer sides of the cylinders, gates for controlling the passage of sheets to the cylinders, and means for operating the gates to permit the passage of sheets to the cylinders and in position to be gripped by the grippers and be carried by the latter into predetermined coacting relation between the cylinders.

7. In a sheet mounting apparatus, the combination with coacting rotatable pressing members, of means for delivering a set of body sheets to the pressing members to be passed successively between them, means for delivering sheets to opposite sides of the body sheets to be pressed thereagainst during their said passage, gates for respectively controlling the passage of the sheets of the different sets to the pressing members, and means for operating said gates in predetermined timed relation.

8. In a sheet mounting apparatus, the combination with upper and lower pressing cylinders, of a conveyor leading to the coacting portions of the cylinders for transporting body sheets in succession thereto, means for delivering sheets successively to the upper and lower sides of the upper and lower cylinders respectively, means for attaching said sheets to the cylinders to cause the latter to carry them to opposite sides of the body sheets and be passed therewith between the cylinders, gates for respectively controlling the passage of the sheets of the different sets to the pressing cylinders, and means for operating said gates in predetermined timed relation.

9. In a sheet mounting apparatus, the combination with upper and lower pressing members, of a support for a pile of body sheets located at one side of the same, means for delivering sheets fed from the pile successively between the members, means for delivering sheets from an elevated position to the upper sides of the body sheets as they pass between the pressing members, means delivering sheets from a lower position to the under sides of the body sheets as they pass between the pressing members, and means for timing the delivery of the various sheets to secure their assemblage in predetermined relation.

10. In a sheet mounting apparatus, the combination with upper and lower pressing members, of a support for a pile of body sheets located at one side of the same, means for delivering sheets fed from the pile successively between the members, means for delivering sheets from an elevated position to the upper sides of the body sheets as they pass between the pressing members, means delivering sheets from a lower position to the under sides of the body sheets as they pass between the pressing members, gates for controlling the delivery of the various sheets, and means for actuating the gates to deliver the sheets in predetermined timed relation.

11. In a sheet mounting apparatus, the combination with upper and lower rotatable pressing cylinders, of means at one side of the same for supporting a pile of body sheets, feeding means for delivering the sheets successively to the coacting portions of the cylinders, an elevated sheet feeding means behind the upper cylinder that delivers sheets successively to said upper cylinder, a lower sheet feeding means behind the lower cylinder that delivers sheets successively to said lower cylinder, mechanism for operating the various feeding means in timed relation, and means on the cylinders for attaching the sheets thereto and carrying them around the cylinders and into coaction with the body sheets.

12. In a sheet mounting apparatus, the combination with upper and lower rotatable pressing cylinders, of means at one side of the same for supporting a pile of body sheets, means for delivering the sheets successively to the coacting portions of the cylinders, an elevated sheet feeding means behind the upper cylinder that delivers sheets successively to said upper cylinder, a lower sheet feeder behind the lower cylinder that delivers sheets successively to said lower cylinder, means on the cylinders for attaching the sheets thereto and carrying them around the cylinders and into coaction with the body sheets, gates for controlling the passage of all the sheets to the cylinders, and means for operating the gates in timed relation.

13. In a sheet mounting apparatus, the combination with pressing cylinders, of means for delivering separate body sheets successively to the same to be passed therebetween, means for rotatively supporting a roll of paper, and means for severing the web of paper from the roll into separate sheets and delivering such sheets in timed relation to pass between the cylinders with the body sheets and be pressed thereagainst by said cyinders.

14. In a sheet mounting apparatus, the combination with pressing cylinders, of means for delivering separate body sheets successively to the same to be passed therebetween, means for rotatably supporting a roll of paper, means for severing the web of paper from the roll into separate sheets and delivering such sheets to the cylinders, gates for controlling the body sheets and the cut sheets respectively, and means for operating the gates in timed relation.

15. In a sheet mounting apparatus, the combination with pressing cylinders, of means for delivering separate body sheets, successively to the same to be passed therebetween, means for rotatably supporting a roll of paper, rotary cutting cylinders for severing the web of paper from the roll into separate sheets, means for feeding the web to the cutting cylinders at different rates of speed, and means for carrying off the cut sheets and delivering them to the pressing cylinders in timed relation to the body sheets delivered to said cylinders.

16. In a sheet mounting apparatus, the combination with pressing cylinders, of means for delivering separate body sheets successively to the same to be passed therebetween, means for rotatably supporting a roll of paper, rotary cutting cylinders for severing the web of paper from the roll into separate sheets, means for feeding the web to the cutting cylinders, a changeable speed gear between the cutting cylinders and the feeding means to operate the latter at different rates of speed, and means for carrying off the cut sheets and delivering them to the pressing cylinders in timed relation to the body sheets delivered to said cylinders.

17. In a sheet mounting apparatus, the combination with pressing cylinders, of means for delivering separate body sheets successively to the same to be passed therebetween, means for rotatably supporting a roll of paper, rotary cutting cylinders for severing the web of paper from the roll into separate sheets, means for feeding the web to the cutting cylinders at different rates of speed, and means for carrying off the cut sheets at a higher rate of speed than the delivery of the web to the cutting cylinders and delivering them to the pressing cylinders in timed relation to the body sheets delivered to said cylinders.

18. In a sheet mounting apparatus, the combination with upper and lower pressing cylinders, of means for delivering thereto a successive series of body sheets, means for feeding to one of the cylinders a successive series of facing sheets, means on said cylinder for carrying the sheets into coaction with one side of the body sheets and therewith between the cylinders, means for holding a roll of paper, means for cutting sheets from the web of the roll of paper thus supported and delivering them to the lower cylinder, and means on said lower cylinder for carrying the cut sheets about it and into coaction with the opposite side of the body sheets and be passed therewith between the pressing cylinders.

19. In a sheet mounting apparatus, the combination with upper and lower pressing cylinders, of means for delivering thereto a successive series of body sheets, means for feeding to one of the cylinders a successive series of facing sheets, means on said cylinder for carrying the sheets into coaction with one side of the body sheets and therewith between the cylinders, means for holding a roll of paper, means for cutting sheets from the web of the roll of paper thus supported and delivering them to the lower cylinder, means on said lower cylinder for carrying the cut sheets about it and into coaction with the opposite side of the body sheets and causing it to be passed therewith between the pressing cylinders, gates for controlling the passage of the various sheets to the pressing cylinders, and means for actuating the gates in predetermined timed relation.

20. In a sheet mounting apparatus, the combination with means for pressing together a plurality of sheets, of means for delivering a plurality of sheets to the sheet pressing means, gate mechanism for controlling the delivery of sheets to the pressing means, means for periodically operating the gate mechanism to insure the sheets being delivered to the pressing means in associated and predetermined timed relation, and means for applying adhesive to certain of said sheets prior to their being brought to the gate mechanism.

21. In a sheet mounting apparatus, the combination with rotatable sheet pressing cylinders, of means for feeding sets of separate sheets thereto, a gate for each set of sheets, means for operating the gates in predetermined timed relation, and means for applying adhesive to the sheets of one of the sets.

22. In a sheet mounting apparatus, the combination with upper and lower pressing cylinders, of a conveyor leading to the coacting portions of the cylinders for transporting body sheets in succession thereto, means for delivering sheets successively to the upper and lower sides of the upper and lower cylinders respectively, means for attaching said sheets to the cylinders to cause the latter to carry them to opposite sides of the body sheets and be passed therewith between the cylinders, gates for respectively controlling the passage of the sheets of the different sets to the pressing cylinders, means for operating said gates in predetermined timed relation, and means for applying adhesive to the body sheets in advance of the gate.

23. In a sheet mounting apparatus, the combination with means for bringing sheets into associated relation, of mechanism for automatically stopping said means on the failure of a sheet to be properly brought for association with another sheet.

24. In a sheet mounting apparatus, the combination with means for associating sheets, of means for delivering a plurality of sets of sheets to the sheet associating means, to cause the sheets of the different sets to be associated, and means for stopping the delivery of the sheets upon the failure of a sheet to be properly delivered.

25. In a sheet mounting apparatus, the combination with means for associating sheets, of means for delivering a plurality of sets of sheets to the sheet associating means, to cause the sheets of the different sets to be associated, means for carrying off the associated sheets, and means for stopping the delivery of the sheets upon the failure of a sheet to be properly delivered, said stopping means permitting the carrying off means to continue in operation.

26. In a sheet mounting apparatus, the combination with means for bringing sheets into associated relation, of means for applying adhesive to certain of the sheets to cause them to adhere when associated, and meachanism for automatically stopping the sheets having the adhesive thereon on the failure of a sheet to be properly brought for association with another sheet.

27. In a sheet mounting apparatus, the combination with means for associating sheets of means for delivering a plurality of sets of sheets to the sheet associating means, to cause the sheets of the different sets to be associated, means for applying adhesive to certain of the sheets to cause them to adhere when associated, means for carrying off the associated sheets, and means for stopping the delivery of the sheets including those having adhesive applied, upon the failure of a sheet to be properly delivered, said stopping means permitting the carrying off means to continue in operation.

28. In a sheet mounting apparatus, the combination with means for pressing together a plurality of sheets, of means for delivering a plurality of sheets to the sheet pressing means, mechanism for controlling the delivery of sheets to the pressing means to insure their being pressed thereby in associated and predetermined timed relation, and means for preventing the operation of the controlling means in the event of the failure of proper delivery of a sheet.

29. In a sheet mounting apparatus, the combination with rotatable sheet pressing cylinders, of means for feeding sets of separate sheets thereto, a gate for each set of sheets, means for operating the gates in predetermined timed relation, and means for stopping the delivery of the sheets to certain of the gates upon the failure of a sheet to be properly presented thereto.

30. In a sheet mounting apparatus, the combination with rotatable sheet pressing cylinders, of means for feeding sets of separate sheets thereto, a gate for each set of sheets, means for operating the gates in predetermined timed relation, means for stopping the delivery of the sheets to certain of the gates and preventing the operation of a gate upon the failure of a sheet to be properly presented thereto.

31. In a sheet mounting apparatus, the combination with rotatable sheet pressing cylinders, of means for feeding sets of separate sheets thereto, a gate for each set of sheets, means for operating the gates in predetermined timed relation, and fluid operated means controlled by the failure of proper presentation of a sheet to one of the gates for preventing the delivery of the sheets to the pressing cylinders.

32. In a sheet mounting apparatus, the combination with rotatable sheet pressing cylinders, of means for feeding sets of separate sheets thereto, a gate for each set of sheets, means for operating the gates in predetermined timed relation, a suction operated device for controlling the feed of the sheets to the pressing cylinders, means for creating suction in said device, and relief means for preventing such suction including vents adjacent the gates and covered by sheets properly brought to the gates.

33. In a sheet mounting apparatus, the combination with coacting pressing members, of means for delivering thereto body members, means for delivering to the pressing members sets of successive facing sheets on opposie sides of the body members to be pressed against the opposite sides of the body members by said pressing members, and fluid operated means for preventing the delivery of the said sheets upon the failure of the proper delivery of a sheet.

34. In a sheet mounting apparatus, the combination with coacting rotatable pressing cylinders, of means for delivering substantially flat body sheets in a substantially rectilinear direction to and between the cylinders, means for delivering sheets to opposite sides of the body sheets to be carried therewith between the cylinders, and means for stopping the delivery of all succeeding sheets to the cylinders upon the failure of the proper delivery of a sheet in advance thereof.

35. In a sheet mounting apparatus, the combination with coacting pressing members, of means for delivering thereto body members, means for delivering to the pressing members sets of successive facing sheets on opposite sides of the body members to be pressed against the opposite sides of the body members by said pressing members, a gate for controlling the delivery of the sheets of each set to secure the delivery of the sheets into coaction in predetermined timed relation, and means for automatically stopping the delivery of sheets of the various sets to the pressing members upon the failure of a sheet to be properly positioned at a gate.

36. In a sheet mounting apparatus, the combination with coacting pressing members, of means for delivering thereto body members, means for delivering to the pressing members sets of successive facing sheets on opposite sides of the body members to be pressed against the opposite sides of the body members by said pressing members, a gate for controlling the delivery of the sheets of each set to secure the delivery of the sheets into coaction in predetermined timed relation, and fluid operated means for automatically stopping the delivery of sheets of the various sets to the pressing members upon the failure of a sheet to be properly positioned at a gate, said automatic means including relief ports at certain of the gates and that are covered by the sheets properly presented to said gates.

37. In a sheet mounting aparatus, the combination with coacting rotatable pressing cylinders, of means for delivering substantially flat body sheets in a substantially rectilinear direction to and between the cylinders, means for delivering sheets to opposite sides of the body sheets to be carried therewith between the cylinders, gates for respectively controlling the passage of the sheets of the different sets to the pressing cylinders, means for operating said gates in predetermined timed relation, means for holding the sheets delivered to the pressing cylinders even if the gates are opened, and means for preventing the operation of the gate that controls the passage of the body sheets.

38. In a sheet mounting apparatus, the combination with upper and lower pressing cylinders, of a conveyor leading to the coacting portions of the cylinders for transporting body sheets in succession thereto, means for delivering sheets successively to the upper and lower sides of the upper and lower cylinders respectively, means for attaching said sheets to the cylinders to cause the latter to carry them to opposite sides of the body sheets and be passed therewith between the cylinders, gates for respectively controlling the passage of the sheets of the different sets to the pressing cylinders, means for operating said gates in predetermined timed relation, a suction operated device for controlling the operation of the gate for the body sheets, means for creating suction in said device, and vent means to prevent such suction including relief ports at the other gates and that are covered by sheets properly positioned at said gates.

39. In a sheet mounting apparatus, the combination with pressing cylinders, of a conveyor leading to the coacting portions thereof for delivering thereto body sheets, a gate for controlling the passage of the sheets to the cylinders, feeding means for delivering facing sheets to the cylinders, gates controlling the passage of the latter sheets, mechanism for effecting the operation of the gates in predetermined timed relation, a suction operated motor, means periodically operated thereby for controlling the operation of the two sheet feeding means, means also actuated by the motor for preventing the operation of the first gate, and means for in turn controlling the operation of the motor, said last mentioned means being controlled by the positions of the sheets at the second two gates.

40. In a sheet mounting apparatus, the combination with pressing cylinders, of a conveyor leading to the coacting portions thereof for delivering thereto body sheets, a gate for controlling the passage of the sheets to the cylinders, feeding means for delivering facing sheets to the cylinders, gates controlling the passage of the latter sheets, mechanism for effecting the operation of the gates in predetermined timed relation, a suction operated motor, means periodically operated thereby for controlling the operation of the two sheet feeding means, means also actuated by the motor for preventing the operation of the first gate, and means for in turn controlling the operation of the motor, said last mentioned means including relief ports to break the vacuum located at the second gates and covered by sheets properly positioned thereat.

41. In a sheet mounting apparatus, the combination with a suction sheet feeder, of means for periodically creating suction thereon, a gate for controlling the passage of sheets fed by the feeder, and means for controlling the operation of the feeder including a device operated on by the sheets positioned at the gate.

42. In a sheet mounting apparatus, the combination with a suction sheet feeder, of means for creating suction therein, a valve for controlling the suction, means for periodically operating the valve, a second and normally inactive valve for controlling said suction, a gate for controlling the passage of sheets fed by the suction feeder, and suction means for controlling the operation of the second valve including vent ports located at the gate and covered by sheets properly positioned thereat.

43. In a sheet mounting apparatus, the combination with mechanism for acting on sheets, of a conveyor for transporting sheets in succession to said mechanism, a gate for controlling the passage of the sheets, means for periodically operating the gate, and means for holding the gate inactive to prevent the passage of the sheets.

44. In a sheet mounting apparatus, the combination with mechanism for acting on sheets, of a conveyor for transporting sheets in succession to said mechanism, a gate for controlling the passage of the sheets, rollers that drop into engagement with the sheets to start them when released by the gate, means for periodically operating the gate and rollers, and means for holding the gate and rollers inactive to prevent the passage of the sheets.

45. In a sheet mounting apparatus, the combination with mechanism for pressing together a plurality of sheets of paper, of a conveyor for transporting a set of sheets in succession to the pressing mechanism, a gate for controlling the passage of the sheets, means for delivering another set of sheets in succession to the pressing mechanism, and mechanism for controlling the operation of the gate including a suction control device and a vent therefor traversed and covered by sheets of the second set.

46. In a sheet mounting apparatus, the combination with mechanism for pressing together a plurality of sheets of paper, of a conveyor for transporting a set of sheets in succession to the pressing mechanism, a gate for controlling the passage of the sheets, means for delivering another set of sheets in succession to the pressing mechanism, a detent for controlling the operation of the gate, means for periodically operating the detent, and means controlled by the second set of sheets for preventing the operation of the detent by said means.

47. In a sheet mounting apparatus, the combination with mechanism for pressing together a plurality of sheets of paper, of a conveyor for transporting a set of sheets in succession to the pressing mechanism, a gate for controlling the passage of the sheets, means for delivering another set of sheets in succession to the pressing mechanism, a detent for controlling the operation of the gate, means for periodically operating the detent, an arm for preventing the detent being operated by said means, a suction motor for actuating the arm, means for periodically creating suction in the motor, and a relief vent for breaking said suction, said vent being covered and uncovered by the sheets of the second set.

48. In a sheet mounting apparatus, the combination with mechanism for operating on a plurality of sheets, of means for cutting a web into a plurality of successive sheets, means for conveying said sheets to the mechanism, a gate controlling the passage of the sheets, a clutch controlled drive for the cutting mechanism, and means controlled by the cut sheets delivered to the gate for controlling the operation of the clutch.

49. In a sheet mounting apparatus, the combination with mechanism for operating on a plurality of sheets, of means for cutting a web into a plurality of successive sheets, means for conveying said sheets to the mechanism, a gate controlling the passage of the sheets, a clutch controlled drive for the cutting mechanism, a device operable periodically to release the clutch, means for controlling the operation of said device, and means controlled by the sheets presented to the gates for governing the operation of the controlling means.

50. In a sheet mounting apparatus, the combination with mechanism for operating on a plurality of sheets, of means for cutting a web into a plurality of successive sheets, means for conveying said sheets to the mechanism, a gate controlling the passage of the sheets, a clutch controlled drive for the cutting mechanism, a device operable periodically to release the clutch, an arm for controlling the operation of said device, a suction device for actuating the arm, means for creating suction in the device, and vent means for said suction device including relief ports covered by the sheets presented to the gate.

51. In a sheet mounting apparatus, the combination with mechanism for operating on a plurality of sheets, of means for cutting a web into a plurality of successive sheets, means for conveying said sheets to the mechanism, a gate controlling the passage of the sheets, means for delivering a second set of sheets to the mechanism, a second gate controlling the sheets of the second set, a clutch controlled drive for the cutting mechanism, and means controlled by the sheets delivered to the second gate for controlling the operation of the clutch.

52. In a sheet mounting apparatus, the combination with mechanism for operating on a plurality of sheets, of means for cutting a web into a plurality of successive sheets, means for conveying said cut sheets to the mechanism, a gate controlling the passage of the sheets, means for delivering a second set of sheets to the mechanism, a second gate controlling the sheets of the second set, a clutch controlled drive for the cutting mechanism, an arm for controlling the operation of the clutch, a suction device for actuating the arm, means for creating suction in the device, and vent means for said suction device including relief ports covered by the sheets presented to the second gate.

53. In a sheet mounting apparatus, the combination with mechanism for operating on a plurality of sheets, of means for cutting a web into a plurality of successive sheets, means for conveying said sheets to the mechanism, a gate controlling the passage of the sheets, a clutch controlled drive for the cutting mechanism; and means controlled by the cut sheets delivered to both gates for controlling the operation of the clutch.

54. In a sheet mounting apparatus, the combination with mechanism for operating on a plurality of sheets, of means for cutting a web into a plurality of successive sheets, means for conveying said cut sheets to the mechanism, a gate controlling the passage of the sheets, means for delivering a second set of sheets to the mechanism, a second gate controlling the sheets of the second set, a clutch controlled drive for the cutting mechanism, an arm controlling the operation of the clutch, a suction device for actuating the arm, means for creating suction in the device, and vent means for said suction device including relief ports covered by the sheets presented to both gates.

55. In a sheet mounting apparatus, the combination with a pair of pressing cylinders, a pair of cutting rollers for severing a paper web into separate sheets, a drive member for the cutting rollers a movable clutch for coupling the drive member to the cutting rollers, a conveyor for transferring the cut sheets from the cutting rollers to the pressing cylinders, a gate coacting with the conveyor for controlling the passage of the sheets, a dog for moving the clutch to inactive position, an arm for holding the dog inactive, a suction device for moving the arm to said holding position, means for creating suction in the device, and a vent mechanism for preventing the creation of such suction, said vent mechanism including relief ports adjacent the gate and covered by sheets presented thereto.

56. In a sheet mounting apparatus, the combination with a pair of pressing cylinders, of a pair of cutting rollers for severing a paper web into separate sheets, a drive member for the cutting rollers, a movable clutch for coupling the drive member to the cutting rollers, a conveyor for transferring the cut sheets from the cutting rollers to the pressing cylinders, a gate coacting with the conveyor for controlling the passage of the sheets, means for delivering a second set of sheets to the pressing cylinders, a gate controlling the sheets of the second set, a dog for moving the clutch to inactive position, an arm for holding the dog inactive, a suction device for moving the arm to said holding position, means for creating suction in the device, and a vent mechanism for preventing the creation of such suction, said vent mechanism including relief ports adjacent the two gates and covered by sheets presented thereto.

57. In a sheet mounting apparatus, the combination with a pair of pressing cylinders, of a pair of cutting rollers for severing a paper web into separate sheets, a drive member for the cutting rollers, a movable clutch for coupling the drive member to the cutting rollers, a conveyor for transferring the cut sheets from the cutting rollers to the pressing cylinders, a gate coacting with the conveyor for controlling the passage of the sheets, means for delivering a second set of sheets to the pressing cylinders, a gate controlling the sheets of the second set, means for delivering a set of body sheets to the pressing cylinders and between the first two sets, a third gate controlling the passage of the body sheets, a dog for moving the clutch to inactive position, an arm for holding the dog inactive, a suction device for moving the arm to said holding position, means for creating suction in the device, a vent mechanism for preventing the creation of such suction and including relief ports at the first two gates, said ports being covered by the sheets presented to the gates, and a device operating with the dog to hold the third gate against movement.

58. In a sheet mounting apparatus, the combination with mechanism for operating on sheets, of means for conveying sheets in succession to the mechanism, a gate controlling the passage of the sheets to the mechanism, a suction device for retarding the sheets as they approach the gate, and means for creating suction in the device as a sheet approaches the gate and cutting off said suction to release the sheets when the gates are opened.

59. In a sheet mounting apparatus, the combination with mechanism for operating on sheets, of means for conveying sheets in succession to the mechanism, a gate controlling the passage of the sheets to the mechanism, a suction head located in advance of the gate and having inlet ports traversed by the sheets as they approach the gate, means for alternately creating and cutting off suction through the ports, means for periodically operating the gate, and mechanism for timing the suction mechanism and gates to cause suction through the head as a sheet traverses the same and approaches the gate and cuts off said suction to release the sheet and permit it to pass when the gate releases said sheet.

60. In a sheet mounting apparatus, the combination with mechanism for operating on sheets, of means for conveying sheets in succession to the mechanism, a gate controlling the passage of the sheets to the mechanism, a suction head located in advance of the gate and having inlet ports traversed by the sheets as they approach the gate, means for alternately creating and cutting off suction through the ports, means for periodically operating the gate, mechanism for timing the suction mechanism and gates to cause suction through the head as a sheet traverses the same and approaches the gate and cuts off said suction to release the sheet and permit it to pass when the gate releases said sheet, and means for further maintaining the suction to hold the sheet while permitting the gate to operate.

61. In a sheet mounting apparatus, the combination with mechanism for operating on sheets, of means for conveying sheets in succession to the mechanism, a gate controlling the passage of the sheets to the mechanism, a suction head located in advance of the gate and having inlet ports traversed by the sheets as they approach the gate, a valve for controlling the suction through the ports, means for periodically operating the gate, means for periodically operating the valve in predetermined timed relation to the gate, and means for holding the valve in open position to maintain suction through the head.

62. In a sheet mounting apparatus, the combination with mechanism for operating on sheets, of means for conveying sheets in succession to the mechanism, a gate controlling the passage of the sheets, a plurality of suction devices for retarding the sheets as they approach the gate, means for periodically creating suction through said devices to retard and then release the sheets, and means for maintaining suction in certain of said devices to continue to hold a sheet when otherwise released by the other suction devices and the gate.

63. In a sheet mounting apparatus, the combination with mechanism for operating on sheets, of means for conveying sheets in succession to the mechanism, a gate controlling the passage of the sheets, a plurality of suction heads for retarding the sheets as they approach the gate and having suction ports covered and uncovered by the sheets approaching the gate, suction conduits connected to the heads, valves in said conduits, means for periodically operating the valves, and means for holding one valve in open position.

64. In a sheet mounting apparatus, the combination with mechanism for operating on sheets, of means for conveying sheets in succession to the mechanism, a gate controlling the passage of the sheets, a plurality of suction heads for retarding the sheets as they approach the gate and having suction ports covered and uncovered by the sheets approaching the gate, suction conduits connected to the heads, separate reciprocable valves in said conduits having engagements to manually secure their simultaneous operation, means for automatically and periodically actuating the valves, and means for holding one valve against such periodic action and in open position.

65. In a sheet mounting apparatus, the combination with sheet uniting mechanism, of means for carrying a plurality of sets of sheets to said mechanism, a gate for controlling the passage of the sheets of each set, a suction device in advance of each gate to retard the sheets as they are presented thereto, and means for creating suction in the devices as sheets approach the gates and cut it off to release the sheets when the gates are opened.

66. In a sheet mounting apparatus, the combination with sheet uniting mechanism, of means for conveying a plurality of sets of sheets to said mechanism, a gate for controlling the passage of the sheets of each set, a suction head in advance of each gate to retard the sheets as they are presented thereto, a suction conduit having branches connected to the heads, a valve for controlling the conduit, means for periodically operating the valve, and means for periodically operating the gate in timed relation to the valve.

67. In a sheet mounting apparatus, the combination with sheet uniting mechanism, of means for conveying a plurality of sets of sheets to said mechanism, a gate for controlling the passage of the sheets of each set, a plurality of suction devices for each gate traversed by the sheets approaching the gate, separate suction conduits connected to the devices, controlling valves in said conduits, means for operating the valves periodically, and means for holding one of the valves against movement and in open position.

68. In a sheet mounting apparatus, the combination with a pair of pressing cylinders, of means for delivering body sheets in succession thereto, a gate controlling such delivery, a feeder for delivering facing sheets in succession to the cylinders including a suction head, mechanism for cutting a web of paper into other facing sheets and delivering the same to the cylinders, a clutch drive for the cutting mechanism, gates controlling the delivery of the facing sheets, sets of suction heads in advance of the latter gates and traversed by the sheets presented thereto, means for controlling the clutch of the cutting mechanism drive, including a suction motor, with which one of the suction heads communicates, a suction conduit connected to the suction motor, a periodically operating valve in said conduit, a second conduit connected to the other set of suction heads, a periodically operated valve in the second conduit, means for holding said second valve against movement and in open position, a valve controlling the suction in the feeder suction head, means for closing said valve when the clutch drive is controlled, means for holding the gate for the body sheets inactive, and means for operating said holding means when the clutch drive is controlled.

69. In a sheet mounting apparatus, the combination with a sheet conveying cylinder, of means for delivering sheets thereto, grippers on the cylinders to attach the sheets thereto, suction means for causing the sheets to adhere to the cylinder, and mechanism for opening the grippers and creating suction in the suction means in predetermined timed relation.

70. In a sheet mounting apparatus, the combination with a sheet conveying cylinder, of means for delivering sheets thereto, grippers on the cylinder to attach the sheets thereto, suction means for causing the sheets to adhere to the cylinder, mechanism for opening the grippers and creating suction in the suction means in predetermined timed relation, means for releasing said suction after the grippers are opened, and ejecting means for detaching the sheets after the suction has been cut off.

71. In a sheet mounting apparatus, the combination with coacting pressing cylinders, of means for delivering sheets to the cylinders, grippers on at least one of the cylinders for engaging and holding the sheets, means for opening the grippers prior to their passage between the cylinders, suction means on the cylinders for holding the sheets thereto, means for creating suction in the suction means before the grippers are opened, and means for cutting off the suction to release the sheets after the suction means has passed between the cylinders.

72. In a sheet mounting apparatus, the combination with coacting pressing cylinders, of means for delivering sheets to the cylinders, grippers on at least one of the cylinders for engaging and holding the sheets, means for opening the grippers prior to their passage between the cylinders, suction means on the cylinders for holding the sheets thereto, means for creating suction in the suction means before the grippers are opened, means for cutting off the suction to release the sheets after the suction means has passed between the cylinders, ejectors on the cylinders, and means for projecting the ejectors after they have passed between the cylinders.

In testimony whereof, I affix my signature.

ALBERT BROADMEYER.